US007265918B2

(12) United States Patent
Sasaki

(10) Patent No.: US 7,265,918 B2
(45) Date of Patent: Sep. 4, 2007

(54) MOVABLE MEMBER SUPPORTING MECHANISM, AND MOVABLE MEMBER SUPPORTING MECHANISM FOR LENS BARREL

(75) Inventor: Takamitsu Sasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/420,680

(22) Filed: May 26, 2006

(65) Prior Publication Data

US 2006/0268430 A1 Nov. 30, 2006

(30) Foreign Application Priority Data

May 31, 2005 (JP) ............................ P2005-160114

(51) Int. Cl.
*G02B 7/02* (2006.01)
(52) U.S. Cl. ........................ 359/819; 359/822; 359/826
(58) Field of Classification Search ................ 359/819, 359/821, 822, 823, 824, 825, 826, 829, 830, 359/811, 813
See application file for complete search history.

(56) References Cited

U.S. PATENT DOCUMENTS

| 4,721,972 | A | 1/1988 | Wakabayashi |
| 4,771,303 | A | 9/1988 | Matsumoto et al. |
| 4,792,822 | A | 12/1988 | Akiyama et al. |
| 4,825,235 | A | 4/1989 | Wakabayashi et al. |
| 4,937,609 | A | 6/1990 | Wakabayashi et al. |
| 5,737,644 | A | 4/1998 | Nomura et al. |
| 5,793,537 | A | 8/1998 | Nomura et al. |
| 5,812,887 | A | 9/1998 | Nomura et al. |
| 6,023,376 | A | 2/2000 | Nomura et al. |
| 6,115,190 | A | 9/2000 | Hirai |
| 6,204,977 | B1 | 3/2001 | Iwasa |
| 6,366,323 | B1 | 4/2002 | Shono |
| 6,853,500 | B2 * | 2/2005 | Nomura et al. ............. 359/695 |
| 6,952,526 | B2 | 10/2005 | Nomura |
| 6,959,148 | B2 | 10/2005 | Nomura |
| 6,963,694 | B2 | 11/2005 | Nomura |
| 6,965,733 | B1 | 11/2005 | Nomura |

(Continued)

FOREIGN PATENT DOCUMENTS

JP 2004-170961 6/2004

OTHER PUBLICATIONS

English language Abstract of JP 2004-170961.

(Continued)

*Primary Examiner*—Timothy Thompson
(74) *Attorney, Agent, or Firm*—Greenblum & Bernstein, P.L.C.

(57) ABSTRACT

A movable member supporting mechanism includes a support ring; first and second rotatable members provided inside the support ring and supported thereby to be integrally rotatable and to be movable relative to each other in an axial direction thereof; a linearly moving member provided inside the support ring and coupled thereto to be integrally movable with the first rotatable member in the axial direction; a biasing device biasing the first and second rotatable members in opposite directions; and first and second position limiting surfaces formed on an inner peripheral surface of the support ring and are provided apart from each other in the axial direction. The linearly moving member is biased by the biasing device via the first rotatable member. The first and second position limiting surfaces limit positions of the linearly moving member and the second rotatable member in the axial direction, respectively.

17 Claims, 13 Drawing Sheets

U.S. PATENT DOCUMENTS

| | | |
|---|---|---|
| 6,978,088 B2 | 12/2005 | Nomura |
| 6,978,089 B2 | 12/2005 | Nomura et al. |
| 6,987,929 B2 | 1/2006 | Nomura |
| 6,987,930 B2 | 1/2006 | Nomura |
| 6,990,291 B2 | 1/2006 | Nomura |
| 7,010,224 B2 | 3/2006 | Nomura |
| 7,013,081 B2 | 3/2006 | Nomura et al. |
| 7,019,915 B2 | 3/2006 | Sakamoto |
| 7,025,512 B2 | 4/2006 | Nomura |
| 7,027,727 B2 | 4/2006 | Nomura |
| 7,031,603 B2 | 4/2006 | Nomura |
| 7,031,604 B2 | 4/2006 | Nomura |
| 7,035,535 B2 | 4/2006 | Nomura |
| 7,039,308 B2 | 5/2006 | Nomura |
| 7,039,311 B2 | 5/2006 | Nomura |
| 7,043,154 B2 | 5/2006 | Nomura |
| 7,050,713 B2 | 5/2006 | Nomura |
| 7,058,293 B2 | 6/2006 | Nomura |
| 7,062,163 B2 | 6/2006 | Nomura |
| 7,068,929 B2 | 6/2006 | Nomura |
| 7,079,761 B2 | 7/2006 | Nomura |
| 7,079,762 B2 | 7/2006 | Nomura |
| 7,085,486 B2 | 8/2006 | Nomura |
| 7,088,916 B2 | 8/2006 | Nomura |
| 2004/0051968 A1 | 3/2004 | Nomura |
| 2004/0141737 A1 | 7/2004 | Nomura |
| 2005/0168847 A1 | 8/2005 | Sasaki |
| 2005/0169621 A1 | 8/2005 | Nomura |
| 2005/0254140 A1 | 11/2005 | Sakamoto |

OTHER PUBLICATIONS

U.S. Appl. No. 11/421,267 to Nomura et al., which was filed May 31, 2006.
U.S. Appl. No. 11/421,223 to Nomura et al., which was filed May 31, 2006.
U.S. Appl. No. 11/425,009 to Nomura, which was filed Jun. 19, 2006.
U.S. Appl. No. 11/420,952 to Sasaki, which was filed May 30, 2006.
U.S. Appl. No. 11/425,168 to Nomura, which was filed Jun. 20, 2006.
U.S. Appl. No. 11/458,491 to Nomura, which was filed Jul. 19, 2006.
U.S. Appl. No. 11/458,586 to Nomura, which was filed Jul. 19, 2006.
U.S. Appl. No. 10/815,193 to Shono, which was filed Apr. 1, 2004.
U.S. Appl. No. 10/815,194 to Shono, which was filed Apr. 1, 2004.

* cited by examiner

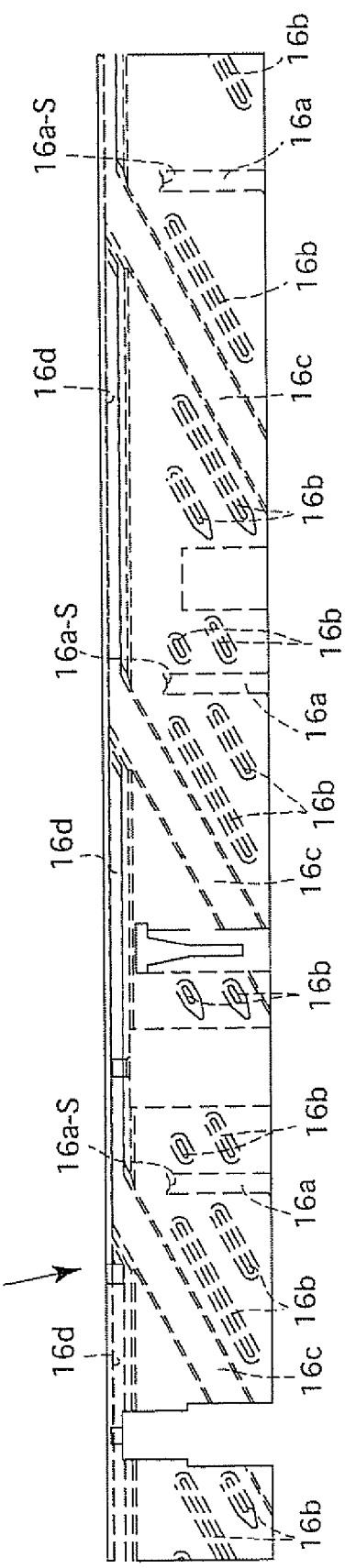
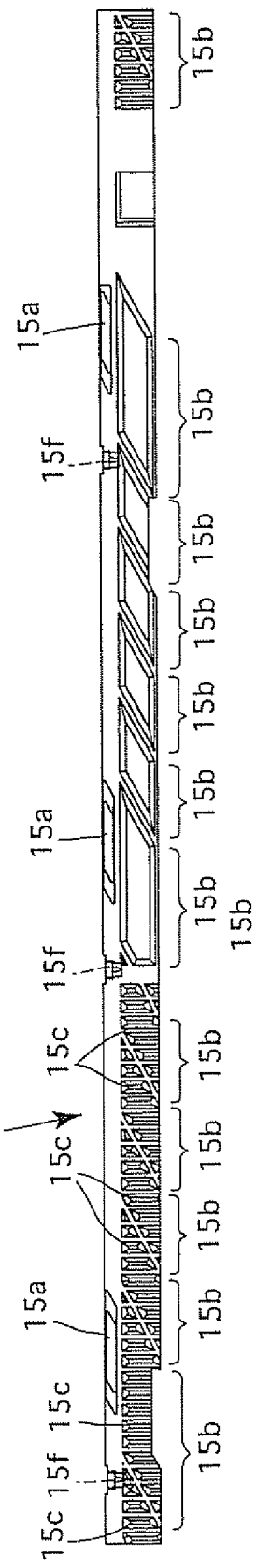
Fig. 11
Fig. 12

MOVABLE MEMBER SUPPORTING MECHANISM, AND MOVABLE MEMBER SUPPORTING MECHANISM FOR LENS BARREL

BACKGROUND OF THE INVENTION

1. Field of the Invention

The present invention relates to a mechanism for supporting movable members in an apparatus such as a lens barrel, and more specifically, relates to such a mechanism which includes a backlash eliminating structure.

2. Description of the Related Art

Play (backlash) is structurally indispensable between two members movably sliding on each other. However, since backlash concurrently has an influence on the accuracy of movement of the movable members, various types of backlash eliminating structures or mechanisms have been proposed. For instance, a lens barrel in which a rotating ring such as a cam ring for moving one or more lens groups in an optical axis direction continues to be extended forward from a lens barrel retracted position until reaching a ready-to-photograph position in a photographable range. However, the structure of a mechanism for eliminating backlash of such a rotating ring tends to be complicated.

The assignee of the present invention has proposed a solution to this problem in U.S. patent application Ser. No. 10/646,872. In this patent application, a first annular rotatable member and a second annular rotatable member which are supported to be movable relative to each other in an axial direction and integrally rotatable are provided inside an annular member, while a first sliding surface of the first annular rotatable member and a second sliding surface of the second annular rotatable member are biased to be in contact with a pair of circumferential surfaces formed on an inner peripheral surface of the annular member, respectively, to thereby make it possible to eliminate backlash by a simple backlash eliminating structure.

SUMMARY OF THE INVENTION

Alternative to a rotatable member such as each annular rotatable member disclosed in the aforementioned patent application, a linearly moving member which moves linearly in an axial direction have been frequently used in apparatuses such as lens barrels, and there has been a demand for eliminating backlash via a simpler structure in movable members (e.g., a rotating member and a linearly moving member) which move in different moving manners. The present invention provides a mechanism for supporting such movable members, wherein the mechanism is simpler in structure than the prior art and capable of eliminating backlash between two or more elements.

According to an aspect of the present invention, a movable member supporting mechanism is provided, including a support ring; a first rotatable member and a second rotatable member which are provided inside the support ring and supported by the support ring to be integrally rotatable in a common rotational direction and to be movable relative to each other in an axial direction thereof; a linearly moving member provided inside the support ring and coupled to the support ring to be integrally movable with the first rotatable member in the axial direction; a biasing device which biases the first rotatable member and the second rotatable member in opposite directions away from each other; and a first position limiting surface and a second position limiting surface which are formed on an inner peripheral surface of the support ring and are provided apart from each other in the axial direction. The linearly moving member is biased by the biasing device via the first rotatable member. The first position limiting surface and the second position limiting surface limit positions of the linearly moving member and the second rotatable member in the axial direction, respectively.

The movable member supporting mechanism can include at least one axial groove formed on an inner peripheral surface of the support ring, at least one of opposite ends of the axial groove being formed as a closed end; and at least one radial projection which projects from the linearly moving member to be engaged in the axial groove. The first position limiting surface is formed at the closed end of the axial groove.

It is desirable for the at least one axial groove to include a plurality of axial grooves, each of which has the closed end and which are arranged at different circumferential positions, and for the at least one radial projection to include a corresponding plurality of radial projections arranged at different circumferential positions.

It is desirable for the movable member supporting mechanism to include at least one circumferential groove formed on an inner peripheral surface of the support ring to extend in a circumferential direction of the support ring; and at least one radial projection which projects from the second rotatable member to be engaged in the circumferential groove. One of axially opposed surfaces in the circumferential groove which are opposed to each other in the axial direction serves as the second position limiting surface.

It is desirable for the at least one radial projection of the second rotatable member to include a plurality of radial projections arranged at different circumferential positions.

The circumferential groove on the support ring can be provided as either a discontinuous circumferential groove consisting of a plurality of circumferential groove portions arranged at different circumferential positions or a single circumferential groove which is continuously formed in a circumferential direction of the support ring.

It is desirable for each of the first rotatable member and the second rotatable member to be formed as a ring member arranged substantially concentrically with the support ring, and for the biasing device to include at least one compression spring installed between end surfaces of the first rotatable member and the second rotatable member which are opposed to each other.

It is desirable for the compression spring to be a plurality of compression springs arranged at different circumferential positions.

In this construction, if the plurality of compression springs are arranged at different circumferential positions, the first and second rotating members do not tilt easily.

It is desirable for the linearly moving member to include a move-away prevention portion which prevents the second rotatable member from moving away from the first rotatable member beyond a predetermined point.

It is desirable for the first rotatable member and the second rotatable member to move between a first state in which each of the first rotatable member and the second rotatable member moves in the axial direction while rotating relative to the support ring, and a second state in which each of the first rotatable member and the second rotatable member rotates at an axial fixed position thereof at one of opposite ends of the range of movement thereof in the axial direction. The linearly moving member and the second rotatable member are in contact with the first position limiting surface and the second position limiting surface, respectively, in the second state. The linearly moving member and the second rotatable member are disengaged from the first position limiting surface and the second position limiting surface, respectively, in the first state.

It is desirable for the second rotatable member to be formed as a helicoid ring including an external helicoid formed on an outer peripheral surface of the helicoid ring. The support ring includes an internal helicoid which is in mesh with the external helicoid of the helicoid ring. Each of the first rotatable member and the second rotatable member moves in the axial direction while rotating relative to the support ring in a state where the internal helicoid of the support ring is in mesh with the external helicoid of the helicoid ring. The internal helicoid of the support ring and the external helicoid of the helicoid ring are disengaged from each other when each of the first rotatable member and the second rotatable member rotates at the axial fixed position thereof.

The movable member supporting mechanism according to the present invention is especially suitable for a lens barrel. Namely, if at least one optical element is provided so as to be moved forward and rearward in an axial direction of the support ring in accordance with an axial movement of the linearly moving member and rotations of the first rotatable member and the second rotatable member, the optical element or elements can be positioned with a high degree of precision.

It is desirable for the support ring to include a fixed ring to which a motor for rotating the first rotatable member and the second rotatable member is fixed.

It is desirable for the biasing device to include a plurality of compression coil springs.

It is desirable for the helicoid ring to include an annular gear which is formed on a thread of the external helicoid to be in mesh with a gear driven by a motor.

It is desirable for the movable member supporting mechanism to be incorporated in a motor-driven photographic lens.

In an embodiment, a movable member supporting mechanism of a lens barrel is provided, including a support ring, an axis of which extends substantially parallel to an optical axis; a first rotating ring and a second rotating ring which are positioned inside the support ring and supported by the support ring to be integrally rotatable in a rotation direction and to be movable relative to each other in the optical axis direction; a linearly moving ring positioned inside the support ring and coupled to the support ring to be integrally movable with the first rotating ring in the optical axis direction; a biasing device which biases the first rotating ring and the second rotating ring in opposite directions away from each other; and a first position limiting surface and a second position limiting surface which are formed on an inner peripheral surface of the support ring and provided apart from each other in the optical axis direction. The linearly moving ring is biased by the biasing device via the first rotating ring. The first position limiting surface and the second position limiting surface limit positions of the linearly moving ring and the second rotating ring in the optical axis direction, respectively.

In an embodiment, a movable member supporting mechanism is provided, including a first movable member and a second movable member which are supported by a support member to be rotatable about a rotational axis relative to each other and to be integrally movable in a direction of the rotation axis. The support member includes a first position limiting surface and a second position limiting surface which face in opposite directions away from each other in the rotation axis direction. The first movable member includes a motion limiting component and a moving-force transfer component which are separated from each other in the rotation axis direction and which are movable relative to each other in the rotation axis direction. The moving-force transfer component is coupled to the second movable member to be integrally movable with the second movable member in the rotation axis direction. The motion limiting component includes an engaging portion engageable with one of the first position limiting surface and the second position limiting surface. The movable member supporting mechanism includes a biasing device which biases the motion limiting component and the moving-force transfer component in directions away from each other. A biasing force of the biasing device causes the engaging portion of the motion limiting component and an engaging portion of the second movable member to be brought into contact with the one and the other of the first position limiting surface and the second position limiting surface, respectively, to thereby limit positions of the first movable member and the second movable member in the rotation axis direction.

According to the present invention, a mechanism for supporting movable members is provided, wherein the mechanism is simpler in structure than the prior art and capable of eliminating backlash between two or more elements.

The present disclosure relates to subject matter contained in Japanese Patent Application No. 2005-160114 (filed on May 31, 2005) which is expressly incorporated herein by reference in its entirety.

BRIEF DESCRIPTION OF THE DRAWINGS

The present invention will be described below in detail with reference to the accompanying drawings in which:

FIG. 11 is a developed view of a stationary ring of the zoom lens shown in FIG. 1;

FIG. 12 is a developed view of a helicoid ring of the zoom lens shown in FIG. 1;

DESCRIPTION OF THE PREFERRED EMBODIMENT

Figure 1:
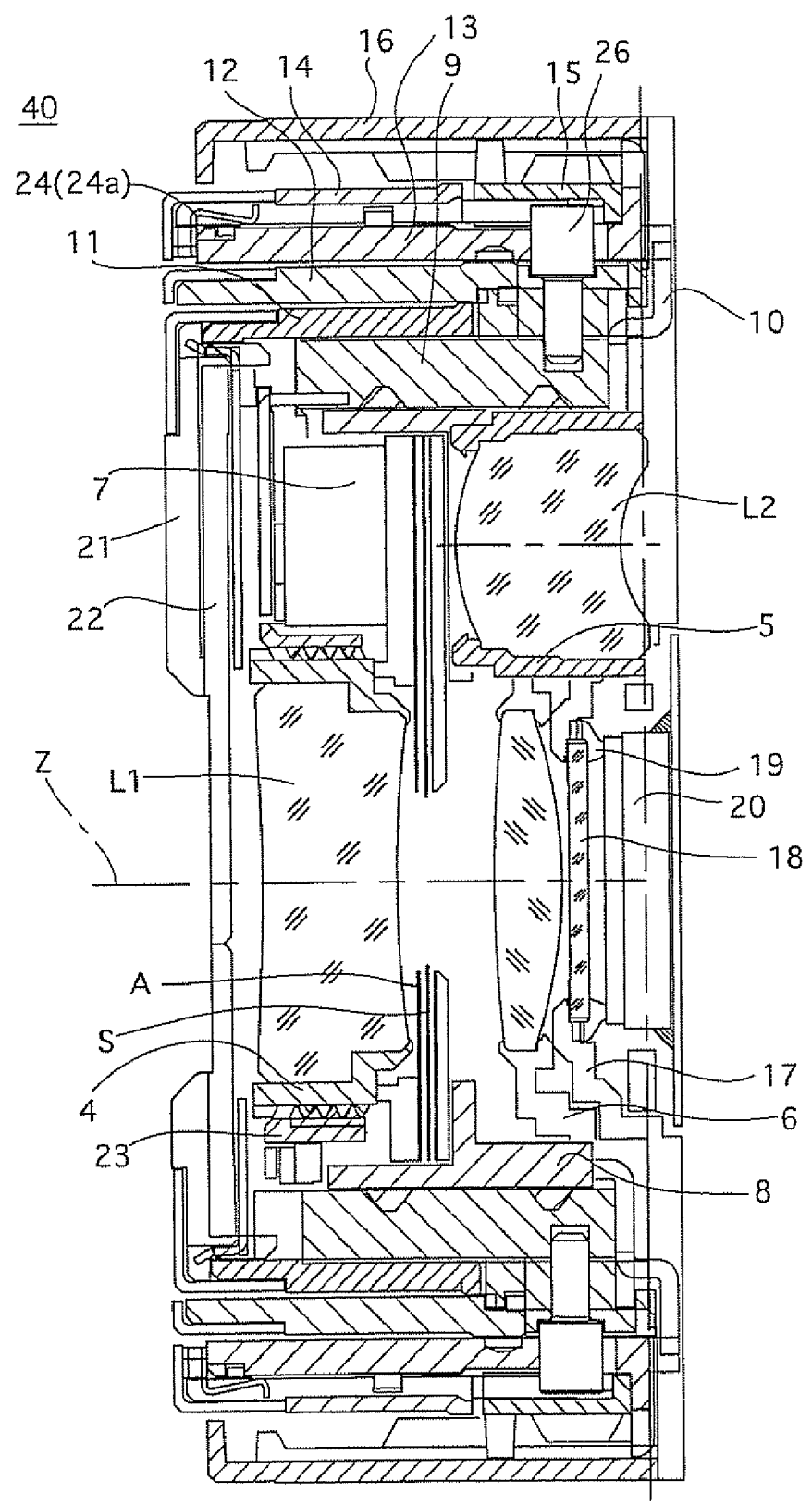
FIG. 1 is a longitudinal sectional view of an embodiment of a retractable zoom lens according to the present invention, showing the retractable zoom lens in the retracted state.
Figure 2:
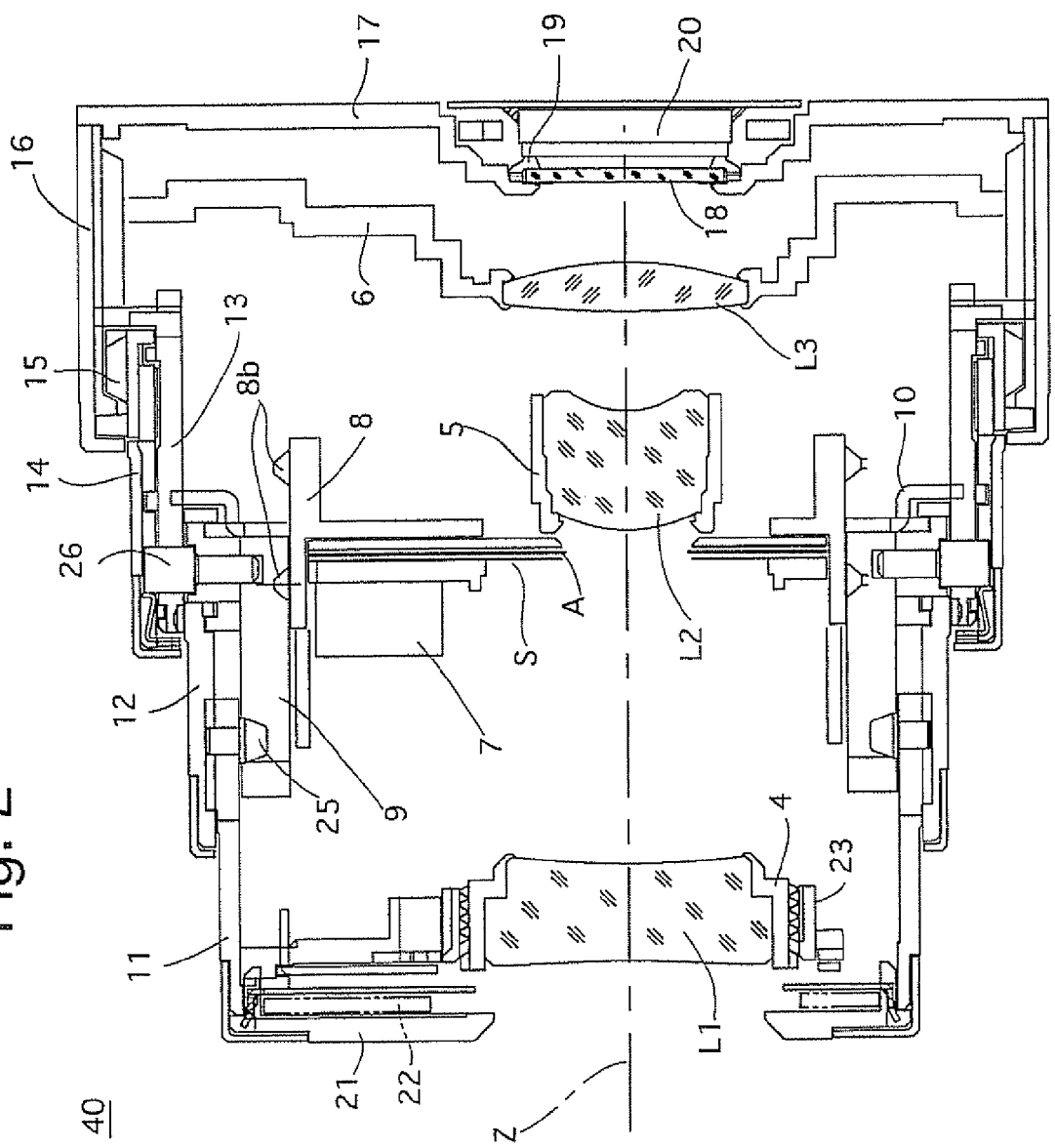
FIG. 2 is a longitudinal sectional view of the zoom lens shown in FIG. 1, showing a ready-to-photograph state of the zoom lens at the wide-angle extremity.
Figure 3:
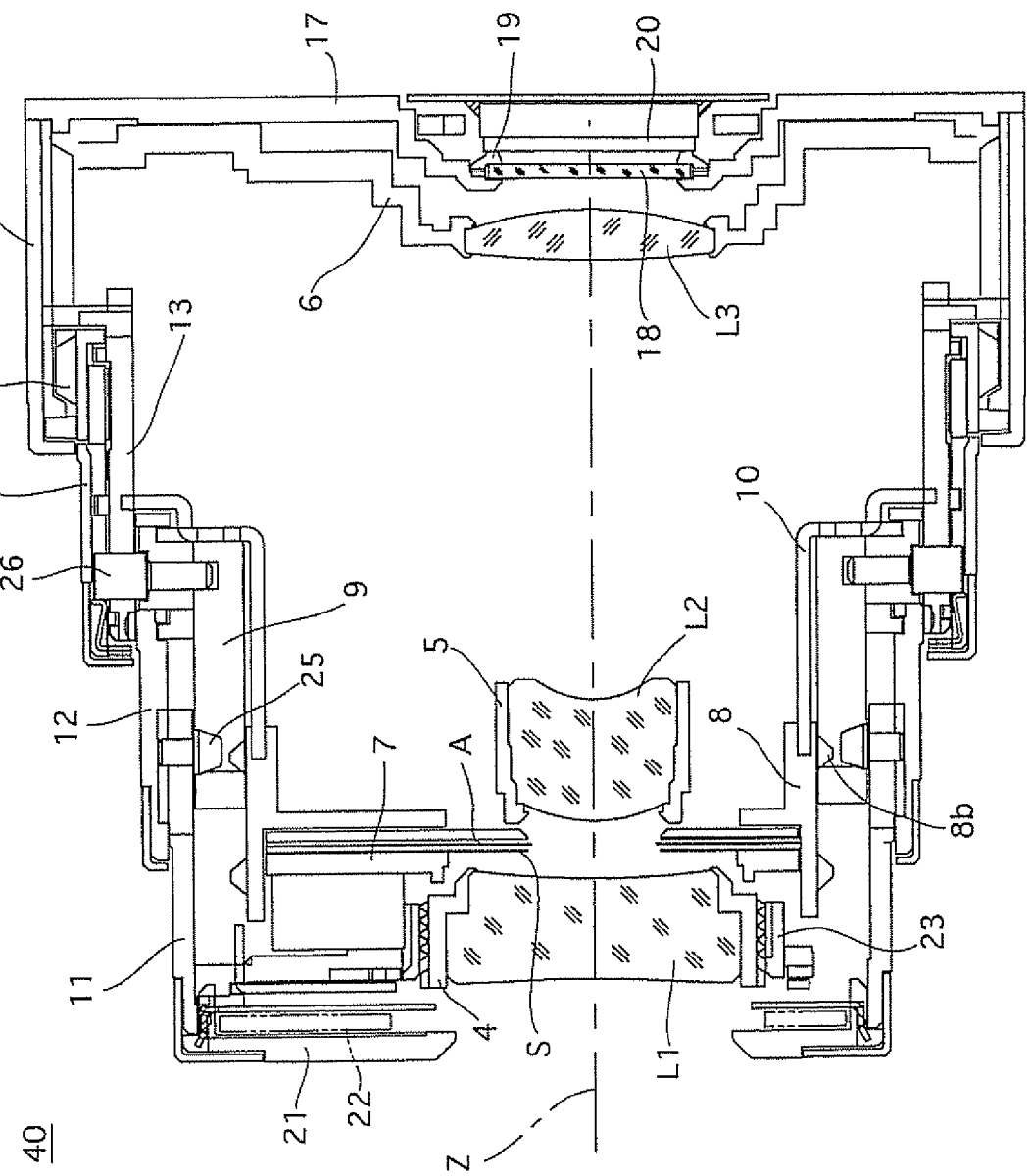
FIG. 3 is a longitudinal sectional view of the zoom lens shown in FIG. 1, showing a ready-to-photograph state of the zoom lens at the telephoto extremity.

FIGS. 1 through 3 are longitudinal sectional views of an embodiment of a zoom lens 40 to which the present invention is applied. The zoom lens 40 is incorporated in a digital camera. FIG. 1 shows a state where the zoom lens 40 is accommodated (retracted) in the camera body (not shown) of the digital camera. FIG. 2 shows a ready-to-photograph state of the zoom lens 40 at the wide-angle extremity while FIG. 3 shows a ready-to-photograph state of the zoom lens 40 at the telephoto extremity.

The photographing optical system of the zoom lens 40 includes a first lens group L1, a shutter S, a diaphragm A, a second lens group L2, a third lens group L3, a low-pass filter 18, and a CCD image sensor 20. In a ready-to-photograph state, these optical elements lie on a common photographing optical axis Z (see FIGS. 2 and 3). The first lens group L1 and the second lens group L2 are driven along the photographing optical axis Z in a predetermined moving manner to perform a zooming operation, while the third lens group L3 is driven along the photographing optical axis Z to perform a focusing operation. In the following description, the term "optical axis direction" refers to a direction parallel to the photographing optical axis Z unless otherwise stated. Additionally, in the following description, the term "forward/rearward direction" refers to a direction along the photographing optical axis Z; the object side (the left side as viewed in FIG. 1) and the image side (the right side as viewed in FIG. 1) are defined as forward and rearward, respectively.

The zoom lens 40 is provided in a camera body with a stationary ring (support ring/support member) 16 fixed to the camera body. A CCD support plate 17 is fixed to a rear portion of the stationary barrel 16 from behind. The CCD support plate 17 holds the CCD image sensor 20. The low-pass filter 18 is held by the CCD support plate 17 to be positioned in front of the CCD image sensor 20. An annular dust-tight sealing member 19 is installed between the low-pass filter 18 and the CCD image sensor 20 to seal the gap therebetween.

Figure 7:
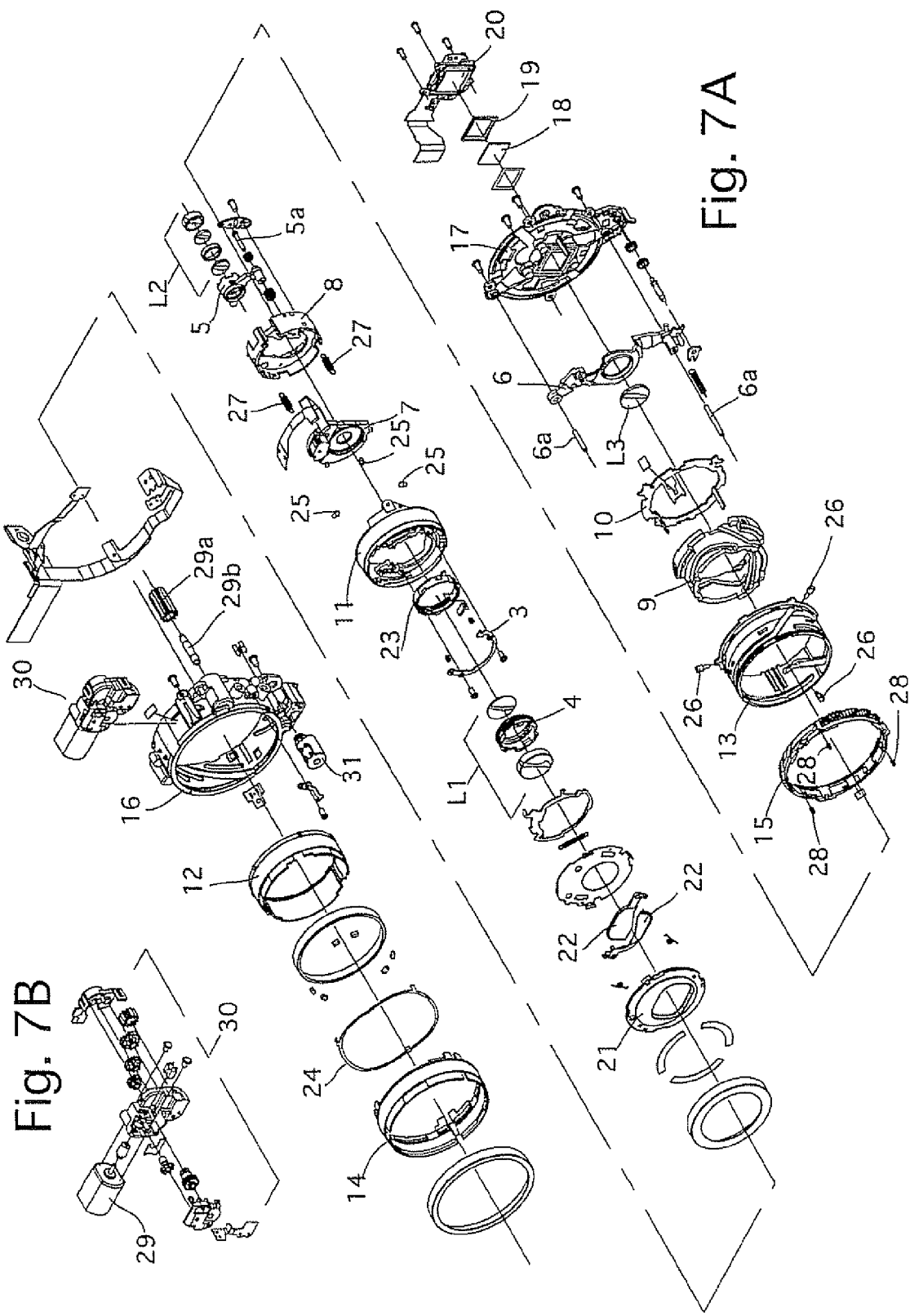
FIG. 7A is an exploded perspective view of the zoom lens shown in FIG. 1.
FIG. 7B is an exploded perspective view of a zoom gear unit shown in FIG. 7A.

The zoom lens 40 is provided in the stationary barrel 16 with a third lens frame 6 which supports and holds the third lens group L3 and which is guided linearly in a direction parallel to the photographing optical axis Z along a pair of parallel guide shafts 6a (see FIG. 7A) which extend parallel to the photographing optical axis Z. Due to this structure, the third lens frame 6 can be linearly moved forward and rearward by a driving force of an AF motor 31. Front and rear ends of each guide shaft 6a are fixed to the stationary barrel 16 and the CCD support plate 17, respectively.

The zoom lens 40 is provided on top of the stationary barrel 16 with a zoom gear unit 30 which is supported by the stationary barrel 16. The zoom gear unit 30 is composed of a zoom motor 29 and a reduction gear box containing a reduction gear train (see FIG. 7B). Via this reduction gear train, a driving force of the zoom motor 29 is transferred to a zoom gear 29a which is supported by the stationary barrel 16 to be rotatable on a zoom gear shaft 29 extending parallel to the photographing optical axis Z.

Figure 10:
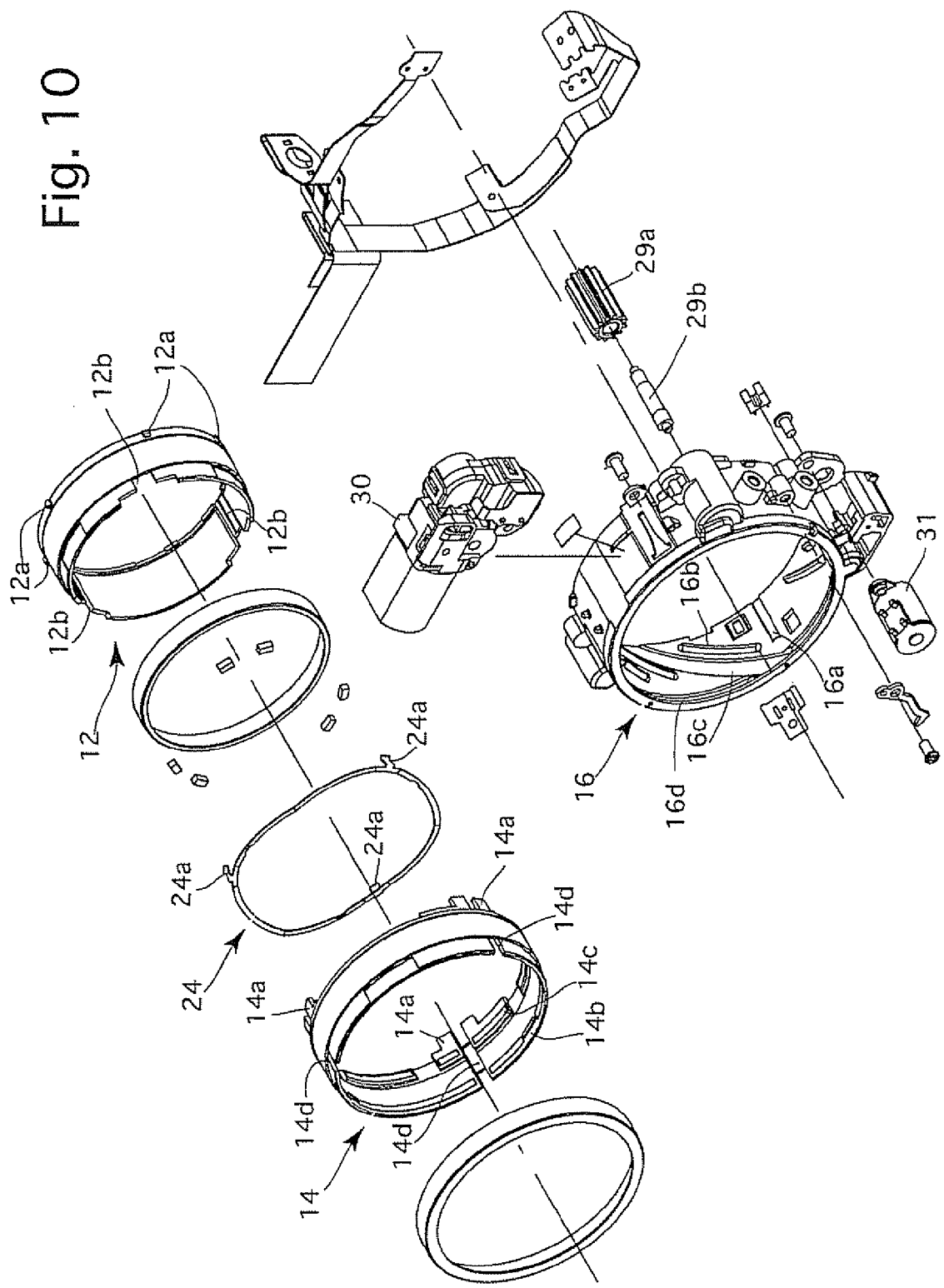
FIG. 10 is an exploded perspective view of another portion of the zoom lens shown in FIG. 7A.

As shown in FIGS. 10 and 11, the stationary barrel 16 is provided on an inner peripheral surface thereof with a set of three linear guide grooves (axial grooves) 16a, an internal helicoid 16b, a set of three inclined grooves 16c and a set of three rotational guide grooves (circumferential grooves) 16d. The set of three linear guide grooves 16a extend parallel to the photographing optical axis Z. The thread of the internal helicoid 16b extends in a direction inclined with respect to both the optical axis direction and a circumferential direction of the stationary barrel 16. The set of three inclined grooves 16c extend parallel to the thread of the internal helicoid 16b. The set of three rotational guide grooves 16d are formed in the vicinity of a front end of the inner peripheral surface of the stationary barrel 16 to extend in a circumferential direction of the stationary barrel 16 to be communicably connected to the front ends of the set of three inclined grooves 16c, respectively. The internal helicoid 16b is not formed on a specific front area of the inner peripheral surface of the stationary barrel 16 which is positioned immediately behind the set of three rotational guide grooves 16d.

Figure 8:
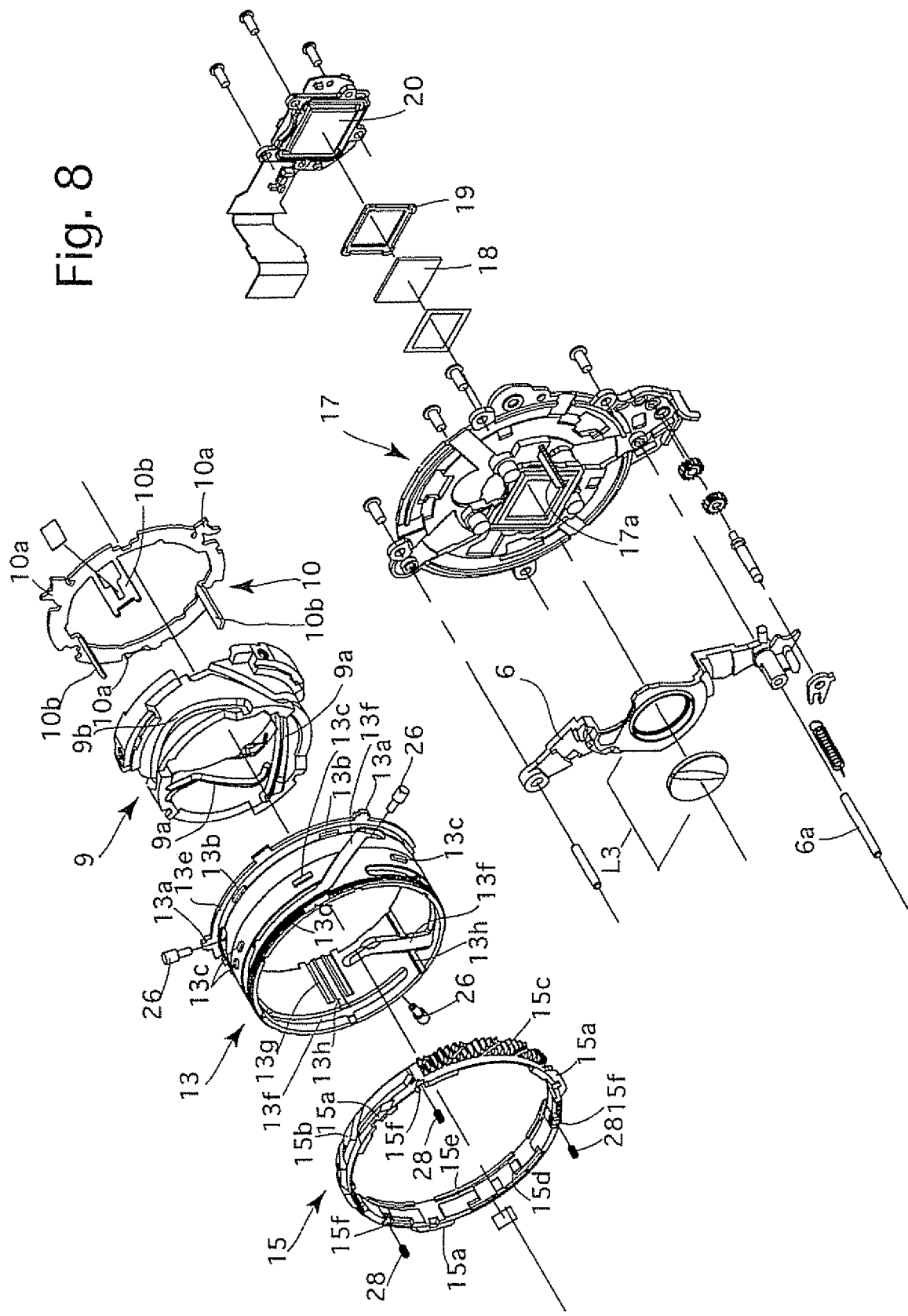
FIG. 8 is an enlarged perspective view of a portion of the zoom lens shown in FIG. 7A.

The zoom lens 40 is provided inside the stationary barrel 16 with a helicoid ring (second rotating member/second rotating ring/first movable member/motion limiting component) 15 (see FIGS. 8 and 12). The helicoid ring 15 is provided on an outer peripheral surface thereof with a set of three rotational guide projections (radial projections/engaging portions) 15a and an external helicoid 15b. The set of three rotational guide projections 15a are respectively engaged in the set of three inclined grooves 16c or the set of three rotational guide grooves 16d of the stationary ring 16, while the external helicoid 15b is engaged with the internal helicoid 16b of the stationary ring 16. The helicoid ring 15 is provided on the thread of the external helicoid 15b with an annular gear 15c which is in mesh with the zoom gear 29a. Therefore, when a rotation of the zoom gear 29a is transferred to the annular gear 15c, the helicoid ring 15 moves forward or rearward in the optical axis direction while rotating about the photographing optical axis Z within a predetermined range in which the external helicoid 15b remains in mesh with the internal helicoid 16b. A forward movement of the helicoid ring 15 which brings the rear end of the external helicoid 15b to a point beyond the front end of the internal helicoid 16b causes the external helicoid 15b to be disengaged from the internal helicoid 16b so that the helicoid ring 15 rotates about the photographing optical axis Z without moving in the optical axis direction relative to the stationary barrel 16 by engagement of the set of three rotational guide projections 15a with the set of three rotational guide grooves 16d. In a state where the internal helicoid 16b is in mesh with the external helicoid 15b, the set of three inclined grooves 16c serve as clearance grooves for preventing the set of three rotational guide projections 15a and the stationary barrel 16 from interfering with each other. Namely, in a state where the internal helicoid 16b is in mesh with the external helicoid 15b, the set of three rotational guide projections 15a are positioned in the set of three inclined grooves 16c, respectively, so that the set of three rotational guide projections 15a and the internal helicoid 16b do not interfere with each other.

As can be appreciated from FIGS. 1 through 3, the zoom lens 40 is a telescopic type having three external telescoping barrels: a first movable barrel (first rotating member/first rotating ring/first movable member/moving-force transfer component) 14, a second movable barrel 12 and a third movable barrel 11, which are concentrically arranged about the photographing optical axis Z. The helicoid ring 15 is provided, on an inner peripheral surface thereof at three different circumferential positions on the helicoid ring 15, with three rotation transfer recesses 15d, the front ends of which are open at the front end of the helicoid ring 15. The first movable barrel 14 is provided, at corresponding three different circumferential positions thereon, with three pairs of rotation transfer projections 14a which project rearward from the rear end of the first movable barrel 14 to be engaged in the three rotation transfer recesses 15d from the front of the helicoid ring 15, respectively. The three pairs of rotation transfer projections 14a and the three rotation transfer recesses 15d are respectively engaged with each other to be movable relative to each other in the direction of the photographing optical axis Z and not to be rotatable relative to each other about the photographing optical axis Z (so that rotation of the helicoid ring 15 can be transferred to the first movable barrel 14). Namely, the first movable barrel 14 and the helicoid ring 15 rotate integrally. The zoom lens 40 is provided between the first movable barrel 14 and the helicoid ring 15 with three separating biasing springs (biasing device) 28 which are installed between the first movable barrel 14 and the helicoid ring 15 in a compressed fashion to bias the first movable barrel 14 and the helicoid ring 15 in opposite directions away from each other in the photographing optical axis direction.

The first movable barrel 14 is provided on an inner peripheral surface thereof with a set of three inward projections 14b which project radially inward, a circumferential groove 14c and a set of three rotation transfer grooves 14d which extend parallel to the photographing optical axis Z. The set of three inward projections 14b are arranged at different circumferential positions. The circumferential positions of the three rotation transfer grooves 14d correspond to the three pairs of rotation transfer projections 14a, respectively, and the rear end of each rotation transfer groove 14d passes between the associated pair of rotation transfer projections 14a to be open rearward. The helicoid ring 15 is provided on an inner peripheral surface thereof with a circumferential groove 15e.

The zoom lens 40 is provided inside the first movable barrel 14 and the helicoid ring 15 with a linear guide ring (linearly moving member/linearly moving ring/second movable member) 13. The linear guide ring 13 is provided on an outer peripheral surface thereof with a set of three linear guide projections 13a (radial projections/engaging portions), a first plurality of radial outward projections 13b, a second plurality of radial outward projections 13c and a circumferential groove 13d, in that order from the rear of the linear guide ring 13 in the optical axis direction. The set of three linear guide projections 13a project radially outwards. The first plurality of radial outward projections 13b are arranged at different circumferential positions, while the second plurality of radial outward projections 13c are arranged at different circumferential positions. The linear guide ring 13 is provided at the rear end thereof with an outer annular flange (move-away prevention portion) 13e from which the three linear guide projections 13a project radially outwards. The linear guide ring 13 is guided linearly in the optical axis direction without rotating by the engagement of the set of three linear guide projections 13a with the set of three linear guide grooves 16a of the stationary barrel 16. The first movable barrel 14 is coupled to the linear guide ring 13 to be rotatable relative thereto by the engagement of the set of three inward projections 14b with the circumferential groove 13d. The helicoid ring 15 is coupled to the linear guide ring 13 to be rotatable relative thereto by the engagement of the first plurality of radial outward projections 13b with the circumferential groove 15e.

The linear guide ring 13 is provided with a set of three roller-guide through-slots (through-grooves) 13f which radially extend through the linear guide ring 13. Each through-slot 13f is provided, at the opposite ends thereof in the optical axis direction, with a front circumferential slot portion and a rear circumferential slot portion, each of which extends in a circumferential direction of the linear guide ring 13, and is further provided between the front circumferential slot portion and the rear circumferential slot portion with a lead slot portion (inclined groove portion) which extends obliquely with respect to both the optical axis direction and the front and rear circumferential slot portions. The zoom lens 40 is provided with a cam ring 9, and a set of three roller followers 26 fixed to an outer peripheral surface of the cam ring 9 are engaged in the set of three guide through-slots 13f, respectively. The set of three roller followers 26 are further engaged in the set of three rotation transfer grooves 14d through the set of three guide through-slots 13f, respectively. The zoom lens 40 is provided in the vicinity of the first movable barrel 14 with an annular leaf spring (biasing spring) 24. The annular leaf spring 24 is provided at different circumferential positions thereof with three roller biasing lugs 24a which project rearward to be engaged in front end portions of the set of three rotation transfer grooves 14d, respectively. The annular leaf spring 24 presses the set of three roller followers 26 rearward via the roller biasing lugs 24a to eliminate backlash between the set of three roller followers 26 and the set of three guide through-slots 13f when the set of three roller followers 26 are engaged in the front circumferential slot portions of the set of three roller-guide through-slots 13f, respectively.

Figure 4:
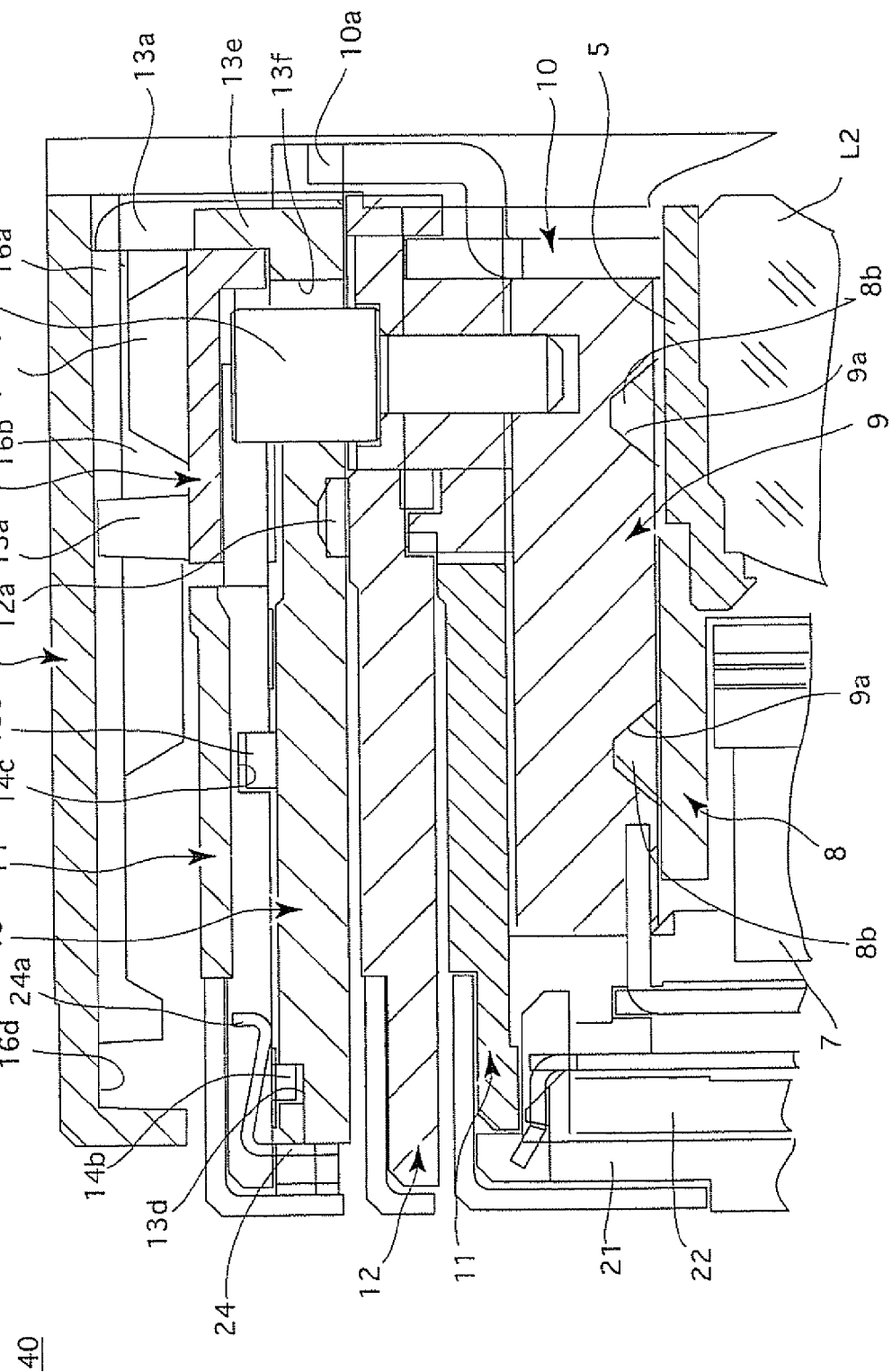
FIG. 4 is a longitudinal sectional view of a portion of the zoom lens in the retracted state.
Figure 5:
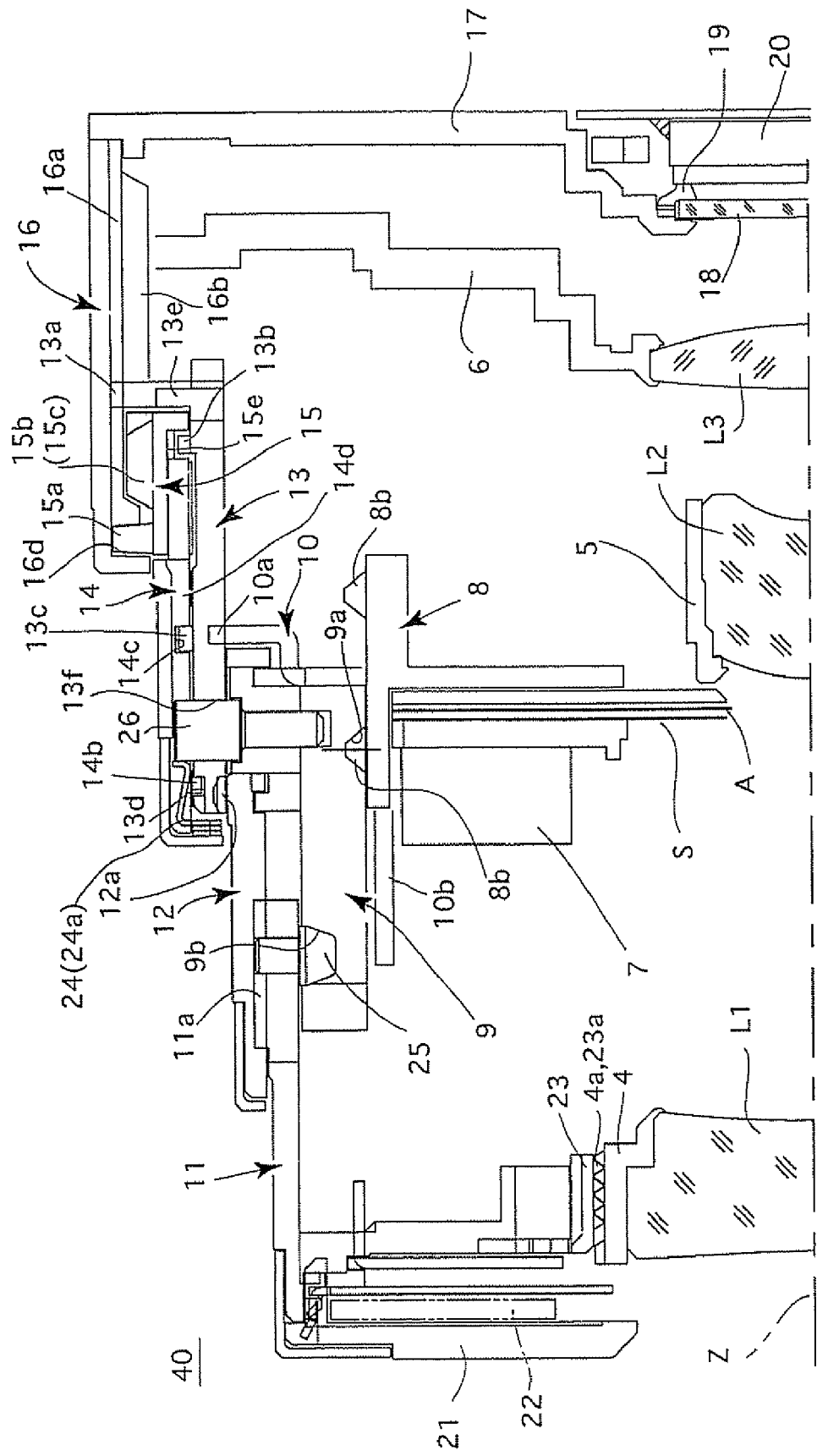
FIG. 5 is a longitudinal sectional view of an upper half of the zoom lens shown in FIG. 1 from the optical axis thereof at the wide-angle extremity.
Figure 6:
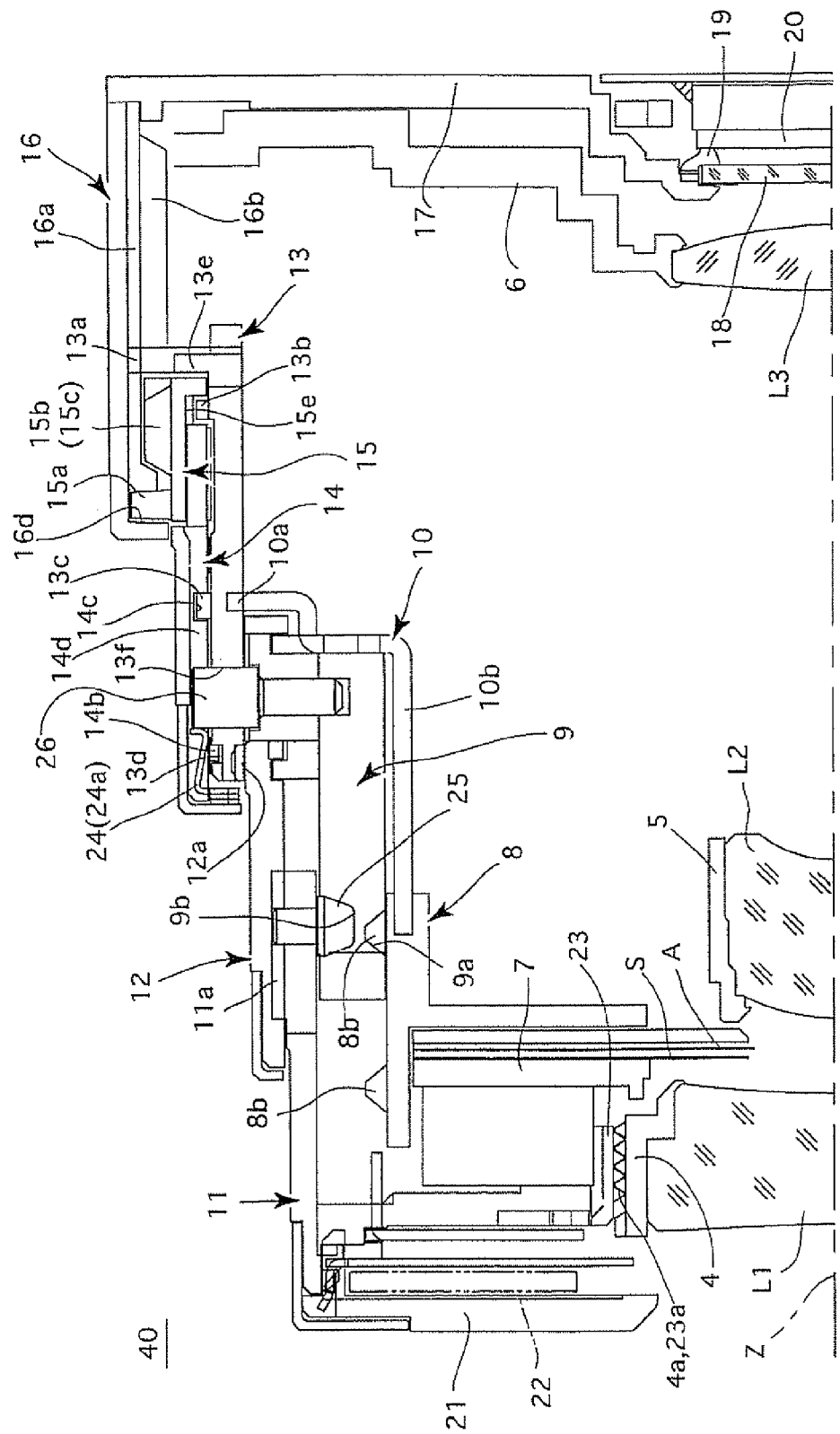
FIG. 6 is a longitudinal sectional view of an upper half of the zoom lens shown in FIG. 1 from the optical axis thereof at the telephoto extremity.

Advancing operations of the cam ring 9, the linear guide ring 13, the first movable barrel 14 and the helicoid ring 15 from the stationary barrel 16 will be discussed hereinafter. When the zoom lens 40 is in the retracted state as shown in FIGS. 1 and 4, rotating the zoom gear 29a in a lens barrel advancing direction by the zoom motor 29 causes the helicoid ring 15 to move forward while rotating due to the engagement of the internal helicoid 16b with the external helicoid 15b. This rotation of the helicoid ring 15 causes the first movable barrel 14 to move forward together with the helicoid ring 15 while rotating together with the helicoid ring 15, and further causes the linear guide ring 13 to move forward together with the helicoid ring 15 and the first movable barrel 14 because the helicoid ring 15 and the first movable barrel 14 are coupled to each other indirectly via the linear guide ring 13. In addition, the torque (rotating force) of the first movable barrel 14 is transferred to the cam ring 9 via the engagement of the set of three roller followers 26 with the set of three rotation transfer grooves 14d when the first movable barrel 14 rotates. Thereupon, the cam ring 9 moves forward while rotating relative to the linear guide ring 13 in accordance with contours of the lead slot portions of the set of three through-slots 13f because the set of three roller followers 26 are also engaged with the set of three guide through-slots 13f, respectively. Since the linear guide ring 13 itself has linearly moved forward together with the helicoid ring 15 and the first movable barrel 14 as described above, the cam ring 9 moves forward in the optical axis direction by a resultant amount of movement corresponding to the sum of the amount of the forward movement of the linear guide ring 13 (and the helicoid ring 15 and the first movable barrel 14) and the amount of the forward movement of the cam ring 9 via the engagement of the set of three roller followers 26 with the lead slot portions of the set of three through-slots 13f, respectively.

The above described rotating-advancing operations are performed only when the external helicoid 15b and the internal helicoid 16b are engaged with each other. At this time, the set of three rotational guide projections 15a of the helicoid ring 15 move along the set of three inclined grooves 16c, respectively. When the helicoid ring 15 is moved forward to a point in the vicinity of the point at the wide-angle extremity, the external helicoid 15b and the internal helicoid 16b are disengaged from each other so that the set of three rotational guide projections 15a move from the set of three inclined grooves 16c into the set of three rotational guide grooves 16d, respectively. Upon this disengagement of the external helicoid 15b from the internal helicoid 16b, the helicoid ring 15 does not move in the optical axis direction relative to the stationary barrel 16 even if rotating, and accordingly, the helicoid ring 15 and the first movable barrel 14 rotate at respective axial fixed positions thereof without moving in the optical axis direction due to the engagement of the set of three rotational guide projections 15a with the set of three rotational guide grooves 16d. The set of three roller followers 26 enter the front circumferential slot portions of the set of three guide through-slots 13f from the lead slot portions of the set of three guide through-slots 13f almost simultaneously with the moment at which the set of three rotational guide projections 15a slide into the set of three rotational guide grooves 16d from the set of three inclined grooves 16c, respectively. Thereupon, the cam ring 9 enters a state in which the cam ring 9 does not receive any moving force to move forward, so that the cam ring 9 rotates at an axial fixed position thereof without moving in the optical axis direction in accordance with rotation of the first movable barrel 14.

Rotating the zoom gear 29a in a lens barrel retracting direction thereof via the zoom motor 29 causes the aforementioned movable elements (which includes the cam ring 9, the linear guide ring 13, the first movable barrel 14 and the helicoid ring 15) of the zoom lens 40 to operate in the reverse manner to the above described advancing operations. In this reverse operation, the continuation of rotation of the helicoid ring 15 until the set of three roller followers 26 enter the rear circumferential slot portions of the set of three guide through-slots 13f from the lead slot portions of the set of three guide through-slots 13f, respectively, causes the aforementioned movable elements to move rearward to their respective retracted positions as shown in FIGS. 1 through 4.

The structure of a portion of the zoom lens 40 which is driven via the cam ring 9 will be discussed hereinafter. As shown in FIG. 8, the linear guide ring 13 is provided on an inner peripheral surface thereof with a set of three pairs of first linear guide grooves 13g which are formed at different circumferential positions to extend parallel to the photographing optical axis Z, and a set of six second linear guide grooves 13h which are formed at different circumferential positions to extend parallel to the photographing optical axis Z. Each alternate groove of the six second linear guide grooves 13h is positioned in between one pair of first linear guide grooves 13g, i.e., each pair of first linear guide grooves 13g are respectively positioned on the opposite sides of the associated second linear guide groove 13h in a circumferential direction of the linear guide ring 13. The zoom lens 40 is provided inside of the linear guide ring 13 with a second-lens-group linear guide ring 10. The second lens group guide ring 10 is provided on an outer edge thereof with a set of three bifurcated projections 10a (see FIG. 8) which project radially outwards from a ring portion of the second lens group guide ring 10. Each bifurcated projection 10a is provided at a radially outer end thereof with a pair of radial projections which are respectively engaged in the associated pair of first linear guide grooves 13g. On the other hand, a set of six radial projections 12a (see FIG. 10), which are formed on an outer peripheral surface of the second movable barrel 12 at a rear end thereof and project radially outwards, are engaged in the set of six second linear guide grooves 13h to be slidable therealong, respectively. Therefore, each of the second lens group guide ring 10 and the second movable barrel 12 is guided linearly in the optical axis direction via the linear guide ring 13.

Figure 9:
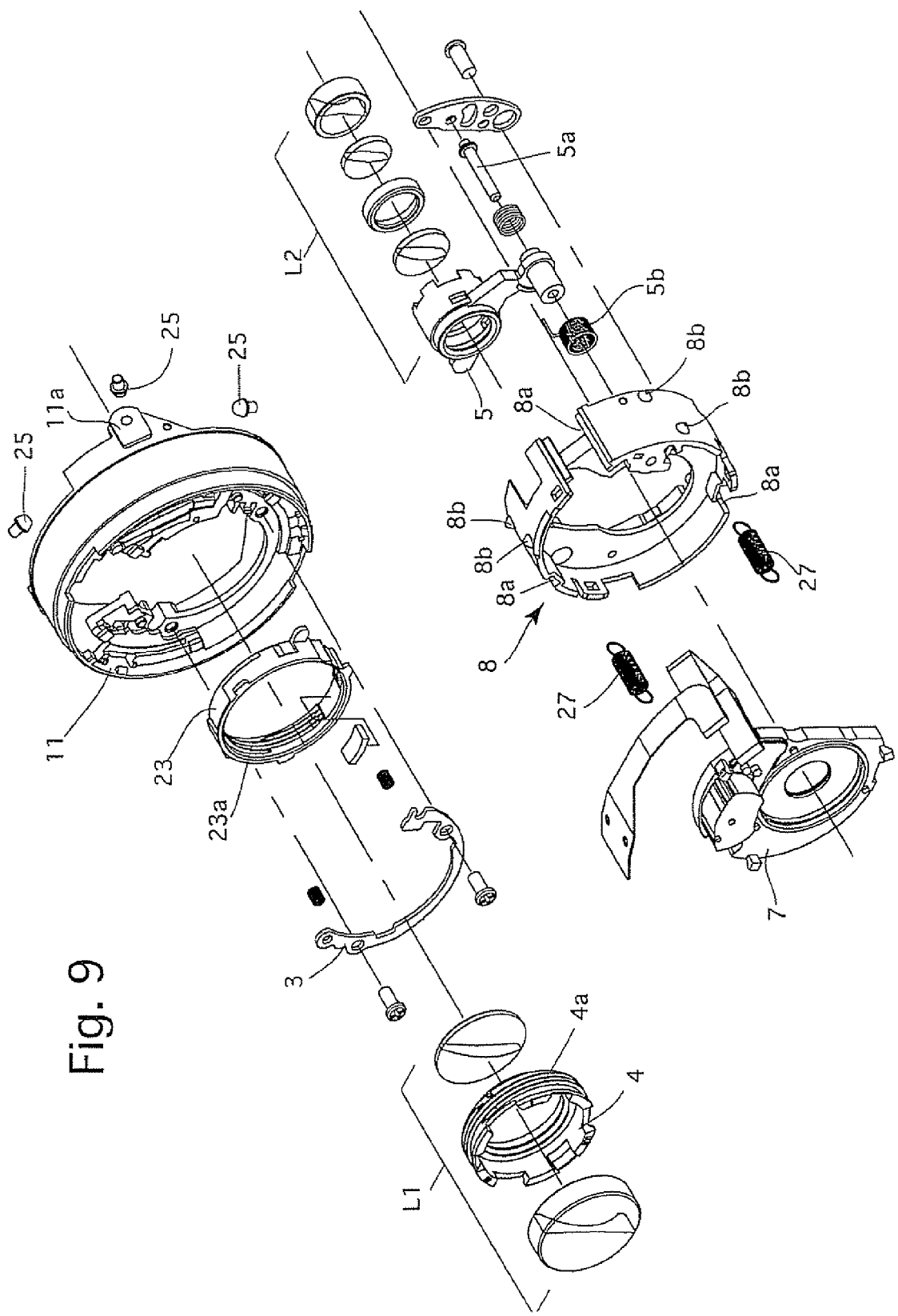
FIG. 9 is an exploded perspective view of another portion of the zoom lens shown in FIG. 7A.

The second lens group guide ring 10 is coupled to the cam ring 9 to be rotatable relative thereto and to be movable together with the cam ring 9 in the optical axis direction. The second lens group guide ring 10 is provided on the ring portion thereof with a set of three linear guide keys 10b which project forward from the ring portion to extend parallel to one another. The zoom lens 40 is provided radially inside the cam ring 9 with a second lens group moving frame 8 having a set of three linear guide grooves 8a (see FIG. 9) in which the set of three linear guide keys 10b of the second lens group guide ring 10 are engaged, respectively, so that the second lens group moving frame 8 is guided linearly in the optical axis direction by the second lens group guide ring 10 via the engagement of the set of three linear guide keys 10b with the set of three linear guide grooves 8a. The cam ring 9 is provided on an inner peripheral surface thereof with a set of three inner cam grooves 9a in which a set of three front cam followers 8b or a set of three rear cam followers 8b formed on an outer peripheral surface of the second lens group moving frame 8 are engaged, respectively. Since the second lens group moving frame 8 is guided linearly in the optical axis direction by the second lens group guide ring 10, a rotation of the cam ring 9 causes the second lens group moving frame 8 to move in the optical axis direction in a predetermined moving manner in accordance with contours of the set of three inner cam grooves 9a.

The zoom lens 40 is provided inside the second lens group moving frame 8 with a second lens frame (radially-retractable lens frame/swingable frame) 5 which supports and holds the second lens group L2. The second lens frame 5 is pivoted about a pivot shaft 5a (see FIG. 9) which is fixed to the second lens group moving frame 8 to extend parallel to the photographing optical axis Z. The pivot shaft 5a is positioned a predetermined distance away from the photographing optical axis Z, and extends parallel to the photographing optical axis Z. The second lens frame 5 is swingable about the pivot shaft 5a between an inserted position (on-axis position) shown in FIGS. 2 and 3 where the optical axis of the second lens group L2 coincides with the photographing optical axis Z, and a radially-retracted position (off-axis position) shown in FIG. 1 where the second lens group L2 is positioned above the photographing optical axis Z. The second lens frame 5 is continuously spring-biased to rotate toward the aforementioned inserted position by a torsion coil spring 5b (see FIG. 9). The second lens frame 5 moves together with the second lens group moving frame 8 in the optical axis direction. The CCD support plate 17 is provided with a position-control cam bar 17a (see FIG. 8) which projects forward from the CCD support plate 17. If the second lens group moving frame 8 moves rearward in a retracting direction to approach the CCD support plate 17, the position-control cam bar 17a presses the second lens frame 5 to rotate the second lens frame 5 to the radially-retracted position against the spring force of the torsion coil spring 5b that biases the second lens frame 5.

The second movable barrel 12 is provided on an inner peripheral surface thereof with a set of three linear guide grooves 12b (see FIG. 10) which are formed at different circumferential positions and extend parallel the photographing optical axis Z. The third movable barrel 11 is provided, on an outer peripheral surface thereof in the vicinity of the rear end of the third movable barrel 11, with a set of three engaging protrusions 11a (see FIG. 9) which are slidably engaged in the set of three linear guide grooves 12b of the second movable barrel 12, respectively. Accordingly, the third movable barrel 11 is guided linearly in the optical axis direction without rotating via the linear guide ring 13 and the second movable barrel 12. The second movable barrel 12 is coupled to the cam ring 9 to be rotatable relative thereto and to be integrally movable with the cam ring 9 in the optical axis direction. On the other hand, the third movable barrel 11 is provided on an inner peripheral surface thereof with a set of three cam followers 25 which project radially inwards, while the cam ring 9 is provided on an outer peripheral surface thereof with a set of three outer cam grooves 9b in which the set of three cam followers 25 are slidably engaged, respectively, so that the third movable barrel 11 moves forward and rearward in the optical axis direction in accordance with rotation of the cam ring 9.

The zoom lens 40 is provided inside of the third movable barrel 11 with a first lens frame 4 which is supported by the third movable barrel 11 via a first lens frame holder 23. The first lens frame 4 holds the first lens group L1 and is provided on an outer peripheral surface of the first lens frame 4 with a male screw thread 4a. The first lens frame holder 23 is provided on an inner peripheral surface thereof with a female screw thread 23a which is screw-engaged with the male screw thread 4a. A combination of the first lens frame 4 and the first lens frame holder 23 is positioned inside of the third movable barrel 11 and supported thereby. A semicircular retainer 3 which is fixed to the third movable barrel 11 by set screws operates to prevent the first lens frame 4 from rotating relative to the first lens frame holder 23 to thereby prevent the first lens frame 4 from moving in the optical axis direction relative to the first lens frame holder 23 after the position of the first lens frame 4 relative to the first lens frame holder 23 in the optical axis direction is adjusted during assembly of the zoom lens 40 via the male screw thread 4a and the female screw thread 23a.

The third movable barrel 11 that supports the first lens group L1 and the second lens group moving frame 8 which supports the second lens group L2 are biased in directions to approach each other in the optical axis direction by a pair of extension coil springs 27.

The zoom lens 40 is provided between the first lens group L1 and the second lens group L2 with a shutter unit 7 including the shutter S and the diaphragm A. The shutter unit 7 is positioned radially inside of the second lens group moving frame 8 and is fixed thereto.

The zoom lens 40 is provided in the vicinity of the front end of the third movable barrel 11 with a lens barrier support ring 21, and is further provided immediately behind the lens barrier support ring 21 with a lens barrier 22 which is supported by the third movable barrel 11 via the lens barrier support ring 21. The lens barrier 22 includes a pair of barrier blades each of which is pivoted about an associated pivot which is positioned off the optical axis Z and parallel thereto. The lens barrier 22 shuts the frontmost photographing aperture of the zoom lens 40 for the protection of the first lens group L1 when the zoom lens 40 is in the retracted state shown in FIG. 1, while the lens barrier 22 opens the same photographing aperture when the zoom lens 40 is in a ready-to-photograph state shown in FIGS. 2 and 3.

Operations of the zoom lens 40 having the above described structure will be discussed hereinafter. Note that operations of the zoom lens 40 during the advancing stage of the cam ring 9 from the retracted position thereof to a state where the cam ring 9 rotates at the axial fixed position thereof have been described above and will thus be hereinafter only discussed briefly.

In the state shown in FIG. 1, in which the zoom lens 40 is in the retracted state, the zoom lens 40 is fully retracted in the camera body. In this state, upon a main switch of the camera being turned ON, the zoom motor 29 drives the zoom gear 29a in the lens barrel advancing direction and this rotation of the zoom gear 29a causes a combination of the helicoid ring 15 and the first movable barrel 14 to move forward while rotating due to the engagement of the internal helicoid 16b with the external helicoid 15b, and further causes the linear guide ring 13 to move forward linearly together with the first movable barrel 14 and the helicoid ring 15. At this time, the cam ring 9 to which torque is transferred from the first movable barrel 14 moves forward in the optical axis direction by a resultant amount of movement corresponding to the sum of the amount of the forward movement of the linear guide ring 13 and the amount of the forward movement of the cam ring 9 due to the engagement of the set of three roller followers 26 with the lead slot portions of the set of three through-slots 13f, respectively (i.e., due to a lead structure (which includes the set of three roller followers 26 and the lead slot portions of the set of three through-slots 13f) provided between the cam ring 9 and the linear guide ring 13. Immediately after the helicoid ring 15 and the cam ring 9 are moved forward to their respective predetermined positions, their respective rotating-advancing mechanisms (helicoid/lead mechanisms) are released so that the helicoid ring 15 and the cam ring 9 only rotate about the photographing optical axis Z without moving in the optical axis direction.

A rotation of the cam ring 9 causes the second lens group moving frame 8, which is positioned inside of the cam ring 9 and guided linearly in the optical axis direction without rotating by the second lens group guide ring 10, to move in the optical axis direction with respect to the cam ring 9 in a predetermined moving manner due to the engagement of the set of three inner cam grooves 9a with the set of three front cam followers 8b or the set of three rear cam followers 8b, respectively. In the state shown in FIG. 1 in which the zoom lens 40 is in the retracted state, the second lens frame 5, which is positioned in the second lens group moving frame 8, has rotated about the pivot shaft 5a to be held in the radially-retracted position above the photographing optical axis Z by the position-control cam bar 17a. During the movement of the second lens group moving frame 8 from the retracted position to a position in the zooming range, the second lens frame 5 is disengaged from the position-control cam bar 17a to rotate about the pivot shaft 5a from the radially-retracted position to the photographing position, where the optical axis of the second lens group L2 coincides with the photographing optical axis Z by the spring force of the torsion coil spring 5b. Thereafter, the second lens frame 5 remains held in the photographing position until the zoom lens 40 is retracted to the retracted position shown in FIG. 1.

Additionally, when the cam ring 9 is rotated, the third movable barrel 11, which is positioned around the cam ring 9 and guided linearly in the optical axis direction without rotating via the second movable barrel 12, moves in the optical axis direction relative to the cam ring 9 in a predetermined moving manner due to the engagement of the set of three cam followers 25 with the set of three outer cam grooves 9b, respectively.

Therefore, an axial position of the first lens group L1 relative to the imaging area (the light-sensitive surface of the CCD image sensor 20) when the first lens group L1 is moved forward from the retracted position is determined by the sum of the amount of forward movement of the cam ring 9 relative to the stationary barrel 16 and the amount of movement of the third movable barrel 11 relative to the cam ring 9, and an axial position of the second lens group L2 relative to the imaging area when the second lens group L2 is moved forward from the retracted position is determined by the sum of the amount of forward movement of the cam ring 9 relative to the stationary barrel 16 and the amount of movement of the second lens group moving frame 8 relative to the cam ring 9. A zooming operation is carried out by moving the first and second lens groups L1 and L2 on the photographing optical axis Z while changing the distance therebetween. When the zoom lens 40 is driven to advance from the retracted position shown in FIG. 1, the zoom lens 40 firstly moves forward to the position shown in FIG. 2, in which the zoom lens 40 is set at the wide-angle extremity. Subsequently, the zoom lens 40 moves forward to the position shown in FIG. 3, in which the zoom lens 40 is set at the telephoto extremity by a further rotation of the zoom motor 29 in a lens barrel advancing direction thereof.

As can be seen from FIGS. 2 and 3, in the present embodiment of the zoom lens 40, the distance between the first lens group L1 and the second lens group L2 is large when the zoom lens 40 is set at the wide-angle extremity. When the zoom lens 40 is set at the telephoto extremity, the first lens group L1 and the second lens group L2 move in directions to approach each other so that the distance therebetween becomes small. This variation of the distances between the first and second lens groups L1 and L2 for zooming operation is achieved by contours of the set of three inner cam grooves 9a and the set of three outer cam grooves 9b of the cam ring 9. In the zooming range between the wide-angle extremity and the telephoto extremity, the cam ring 9, the first movable barrel 14 and the helicoid ring 15 rotate at respective axial fixed positions thereof without moving in the optical axis direction.

When the first and second lens groups L1 and L2 are in the zooming range, a focusing operation is carried out by moving the third lens group L3 along the photographing optical axis Z by driving the AF motor 31 in accordance with an object distance.

Upon the main switch of the camera being turned OFF, the zoom motor 29 is driven in a lens barrel retracting direction so that the zoom lens 40 operates in the reverse manner to the above described advancing operation to retract the zoom lens 40 as shown in FIG. 1. During the course of this retracting movement of the zoom lens 40, the second lens frame 5 is rotated about the pivot shaft 5a to the radially-retracted position via the position-control cam bar 17a while moving rearward together with the second lens group moving frame 8. When the zoom lens 40 reaches the retracted position, the second lens group L2 is retracted into the space radially outside of the space in which the third lens group L3, the low-pass filter 18 and the CCD image sensor 20 are retracted, as shown in FIG. 1 (i.e., the second lens group L2 is radially retracted into an axial range substantially identical to an axial range in the optical axis direction in which the third lens group L3, the low-pass filter 18 and the CCD image sensor 20 are positioned). This structure of the zoom lens 40 for retracting the second lens group L2 in this manner reduces the length of the zoom lens 40 when the zoom lens 40 is fully retracted, thus making it possible to reduce the thickness of the camera body in the optical axis direction.

As can be understood from the above description, in the zoom lens 40, the first movable barrel 14 and the helicoid ring 15 are moved forward and rotated when the zoom lens 40 moves from the retracted state until reaching a ready-to-photograph state (the zooming range) of the zoom lens 40 and the first movable barrel 14 and the helicoid ring 15 are not moved in the optical axis direction but rotated at respective axial fixed positions in a ready-to-photograph state of the zoom lens 40. The linear guide ring 13 moves forward while following the first external barrel 14 and the helicoid ring 15 when the zoom lens 40 moves from the retracted state until reaching a ready-to-photograph state of the zoom lens 40, and the linear guide ring 13 does not move in the optical axis direction in a ready-to-photograph state of the zoom lens 40. The mechanism for supporting the linear guide ring 13, the first movable barrel 14 and the helicoid ring 15, i.e., a backlash eliminating structure for eliminating backlash in a ready-to-photograph state of the zoom lens 40, will be discussed hereinafter.

Figure 14:
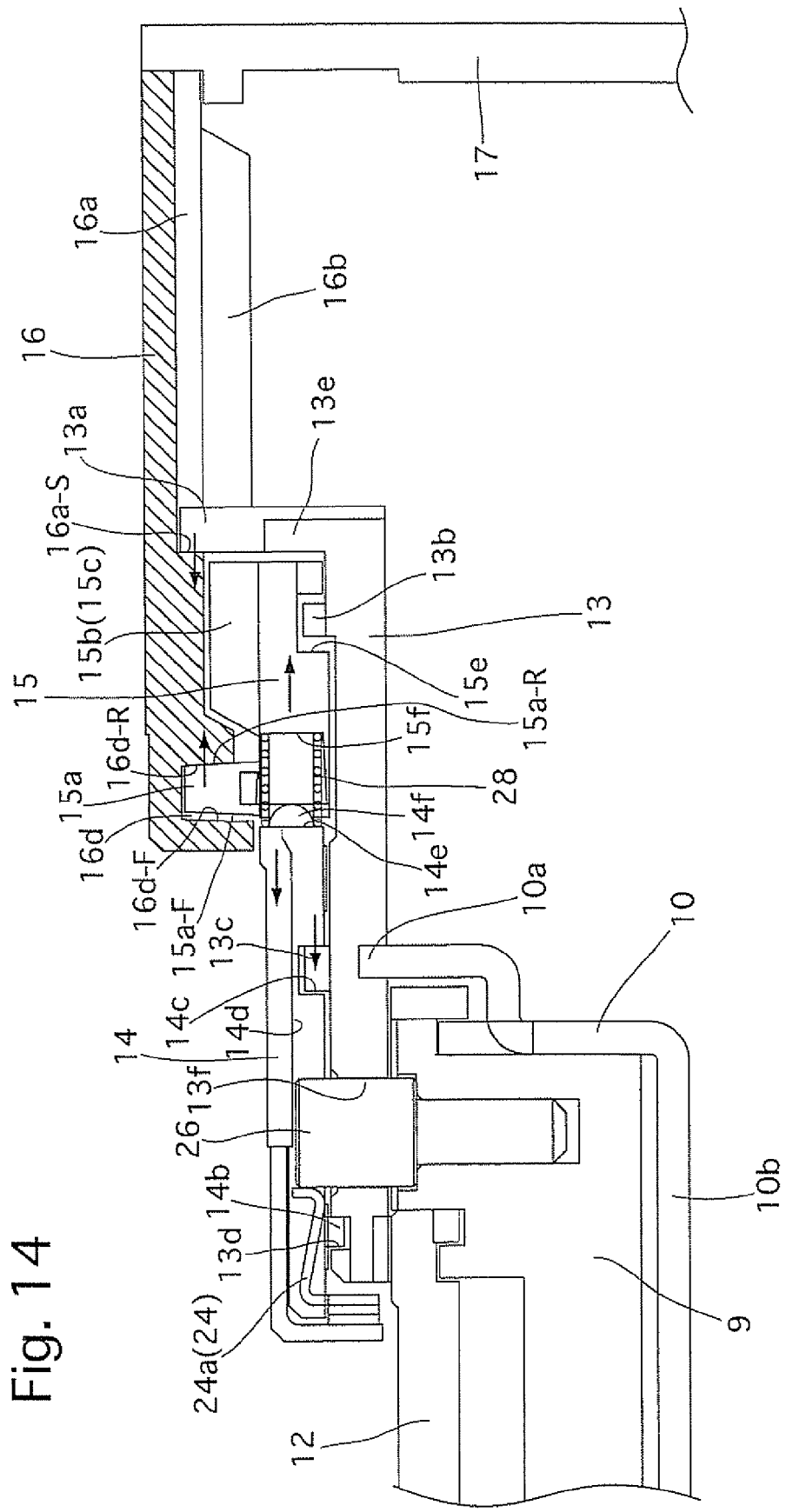
FIG. 14 is a longitudinal sectional view of a portion of the zoom lens in a ready-to-photograph state thereof, showing a relative biasing state among the helicoid ring, a first movable barrel and the linear guide ring.

As described above, the three separating biasing springs 28 are installed between axially opposed surfaces of the first movable barrel 14 and the helicoid ring 15, which are separated from each other in the optical axis direction, to bias the first movable barrel 14 and the helicoid ring 15 in directions away from each other in the photographing optical axis direction. The three separating biasing springs 28 are compression coil springs. As shown in FIG. 14, the three separating biasing springs 28 are accommodated in three accommodation holes (bottomed holes) 15f, the front ends of which are open at the front end of the helicoid ring 15. The three separating biasing springs 28 partly project forward from the three accommodation holes 15f with the front ends of the three separating biasing springs 28 being in contact with three spring-contacting portions 14e, respectively, which are formed at the rear end of the first movable barrel 14. Three dome-shaped support projections 14f on which the front ends of the three separating biasing springs 28 are fitted project rearward from the three spring-contacting portions 14e, respectively.

Each of the first movable barrel 14 and the helicoid ring 15 is coupled to the linear guide ring 13 to be rotatable relative thereto by the engagement of the circumferential groove 14c with the second plurality of radial outward projections 13c, the engagement of the circumferential groove 13d with the set of three inward projections 14b, and the engagement of the circumferential groove 15e with the first plurality of radial outward projections 13b. As shown in FIG. 14, the clearance between the circumferential groove 14c and the second plurality of radial outward projections 13c that are engaged with each other, and the clearance between the circumferential groove 13d and the set of three inward projections 14b that are engaged with each other, are small in the optical axis direction (horizontal direction as viewed in FIG. 14), and accordingly, the first movable barrel 14 and the linear guide ring 13 are coupled to each other so as to integrally move in the optical axis direction (so that a moving force of the linear guide ring 13 in the optical axis direction is transferred to the first movable barrel 14). On the other hand, the circumferential groove 15e and the first plurality of radial outward projections 13b are engaged with each other with a sufficient clearance therebetween in the optical axis direction to allow the helicoid ring 15 to move relative to the linear guide ring 13 in the optical axis direction. Namely, the helicoid ring 15 and the linear guide ring 13 are loosely engaged with each other. Although the linear guide ring 13 and the first movable barrel 14 are coupled to each other at two positions in the optical axis direction: a front position of coupling by the engagement of the circumferential groove 13d with the set of three inward projections 14b and a rear position of coupling by the engagement of the circumferential groove 14c with the second plurality of radial outward projections 13c, the linear guide ring 13 and the first movable barrel 14 can be coupled to each other at only one of these front and rear positions of coupling. For instance, in the present embodiment of the zoom lens 40, the amount of area of engagement between the circumferential groove 14c and the second plurality of radial outward projections 13c is greater than the amount of area of engagement between the engagement of the circumferential groove 13d and the set of three inward projections 14b, and accordingly, the linear guide ring 13 and the first movable barrel 14 are coupled to each other to be capable of moving integrally in the optical axis direction mostly due to the engagement of the circumferential groove 14c with the second plurality of radial outward projections 13c. The circumferential groove 13d and the set of three inward projections 14b serve as a reinforcing portion for stabilizing a front end part of the linear guide ring 13 which is resiliently deformable due to the formation of the set of three guide through-slots 13f.

The rearward movement of the helicoid ring 15 relative to the linear guide ring 13 in the optical axis direction is limited by contact of the helicoid 15 with the outer annular flange 13e of the linear guide ring 13. The distance between the first movable barrel 14 and the helicoid ring 15 in the optical axis direction becomes maximum when the helicoid ring 15 comes into contact with the outer annular flange 13e of the linear guide ring 13. Even in this state where the distance between the first movable barrel 14 and the helicoid ring 15 in the optical axis direction becomes maximum, the distance between the three spring-contacting portions 14e of the first movable barrel 14 and the three accommodation holes 15f of the helicoid ring 15 in the optical axis direction is shorter than the length of each separating biasing spring 28 when it is in a free state, so that the three separating biasing springs 28 are held in a compressed state between axially opposed surfaces of the first movable barrel 14 and the helicoid ring 15. The resilient force of the compressed three separating biasing springs 28 biases the first movable barrel 14 and the helicoid ring 15 in directions away from each other, i.e., biases the first movable barrel 14 and the helicoid ring 15 forward and rearward in the optical axis direction, respectively.

Figure 13:
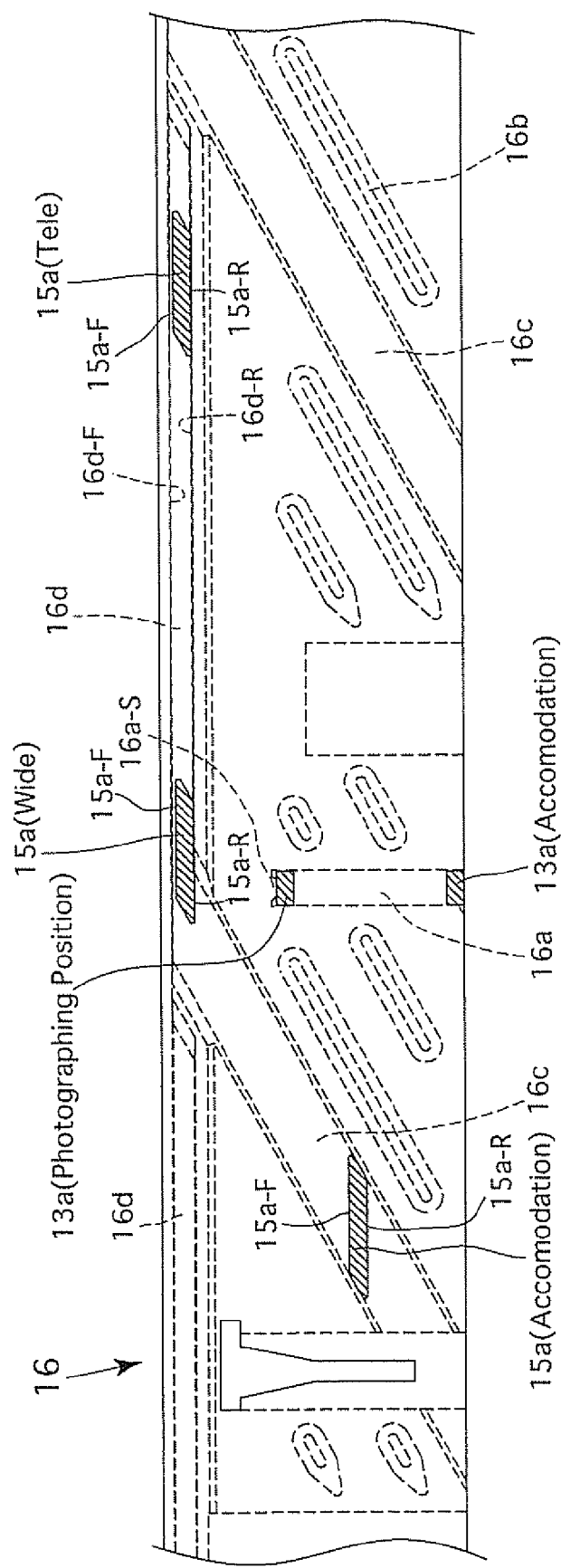
FIG. 13 is a developed view of flange portions of the helicoid ring and engaging projections of a linear guide ring of the zoom lens shown in FIG. 1, showing a relative position between the flange portions and the engaging projections relative to the stationary ring.

As shown in FIGS. 13 and 14, each of the set of three rotational guide grooves 16d, which are formed on an inner peripheral surface of the stationary barrel 16, is provided with a pair of parallel circumferential surfaces: a front circumferential surface 16d-F and a rear circumferential surface (position limiting surface) 16d-R which are opposed to each other in the optical axis direction, while each of the set of three rotational guide projections 15a is provided on opposite sides thereof in the optical axis direction with front and rear flat surfaces 15a-F and 15a-R which are parallel to the front and rear circumferential surfaces 16d-F and 16d-R. The space between the front and rear flat surfaces 15a-F and 15a-R of each rotational guide projection 15a (the thickness of each rotational guide projection 15a in the optical axis direction) is slightly smaller than the space between the front and rear circumferential surfaces 16d-F and 16d-R of each rotational guide groove 16d (the width of each rotational guide groove 16d). The rear end of each linear guide groove 16a in the optical axis direction, which is formed on an inner peripheral surface of the stationary barrel 16, is open at the rear end of the stationary barrel 16, and the front end of each linear guide groove 16a in the optical axis direction is closed by a position limiting surface 16a-S formed at the front end of each linear guide groove 16a.

FIG. 14 shows the relative position among the linear guide ring 13, the first movable barrel 14 and the helicoid ring 15 in the optical axis direction in a ready-to-photo state of the zoom lens 40. As described above, in a ready-to-photo state of the zoom lens 40, the external helicoid 15b and the internal helicoid 16b are disengaged from each other, while the helicoid ring 15 is prevented from moving relative to the stationary barrel 16 in the optical axis direction by the engagement of each rotational guide projection 15a in a zooming range of the associated rotational guide groove 16d between "WIDE" and "TELE" shown in FIG. 13. Thereupon, the rear flat surfaces 15a-R of the set of three rotational guide projections 15a are pressed against the rear circumferential surfaces 16d-R of the set of three rotational guide grooves 16d, respectively, by the biasing force of the three separating biasing springs 28. On the other hand, the first movable barrel 14 is biased forward by the three separating biasing springs 28, and the linear guide ring 13 is also biased forward by the three separating biasing springs 28 via the engagement of the circumferential groove 14c with the second plurality of radial outward projections 13c (and the engagement of the set of three inward projections 14b with the circumferential groove 13d). In a ready-to-photograph state of the zoom lens 40, the set of three linear guide projections 13a of the linear guide ring 13 are positioned at the front ends (the "PHOTOGRAPHY" position shown in FIG. 13) of the set of three linear guide grooves 16a, respectively, and the set of three linear guide projections 13a are pressed against the position limiting surfaces 16a-S of the set of three linear guide grooves 16a, respectively, by the biasing force of the three separating biasing springs 28. Accordingly, in the ready-to-photograph state shown in FIG. 14, the position of the helicoid ring 15 in the optical axis direction is determined by the rear circumferential surfaces 16d-R that are formed to face forwards in the optical axis direction, and the positions of the linear guide ring 13 and the first movable barrel 14 in the optical axis direction are determined by the position limiting surfaces 16a-S that are formed to face rearwards in the optical axis direction. The distance between these two position limiting surfaces (the rear circumferential surfaces 16d-R and the position limiting surfaces 16a-S) in the optical axis direction is determined so that the first movable barrel 14 and the helicoid ring 15 are positioned closer to each other than when the distance between the first movable barrel 14 and the helicoid ring 15 in the optical axis direction is maximum (i.e. in a state where the helicoid ring 15 is in contact with the outer annular flange 13e of the linear guide ring 13). Therefore, in the ready-to-photograph state shown in FIG. 14, the helicoid ring 15 has been moved forward slightly away from the outer annular flange 13e of the linear guide ring 13 so that the degree of compression of the separating biasing springs 28 becomes greater than that in the retracted state of the zoom lens 40.

In this manner, in a ready-to-photograph state of the zoom lens 40, positions of the linear guide ring 13, the first movable barrel 14 and the helicoid ring 15 in the optical axis direction are limited to eliminate backlash among the linear guide ring 13, the first movable barrel 14 and the helicoid ring 15 in the optical axis direction by the above described structure in which the rear circumferential surfaces 16d-R and the position limiting surfaces 16a-S that are formed on the stationary barrel 16 receive the rearward biasing force exerted on the helicoid ring 15 and the forward biasing force exerted on the linear guide ring 13 and the first movable ring 14, respectively. Specifically, the linear guide ring 13 includes the set of three roller-guide through-slots 13f, which are provided to move the cam ring 9 and the second movable barrel 12 forward, and is thus greatly involved in the positional accuracy of each member arranged inside of the linear guide ring 13. Since the positioning of this linear guide ring 13 is made by biasing the linear guide ring 13 in the optical axis direction so as to be engaged directly with the stationary barrel 16, the positioning of each optical element in a ready-to-photograph state of the zoom lens 40 can be maintained with a high degree of accuracy.

When the zoom lens 40 moves from a ready-to-photograph state to the retracted state, a rotating/retracting movement of the helicoid ring 15 causes each of the three rotational guide projections 15a of the helicoid ring 15 to move from the associated rotational guide groove 16d into the associated inclined groove 16c and to eventually reach an "ACCOMMODATION" position shown in FIG. 13 in the associated inclined groove 16c. At the same time, a retracting movement of the linear guide ring 13 causes each of three linear guide projections 13a of the linear guide ring 13 to move in the optical axis direction to the "ACCOMMODATION" position shown in FIG. 13 in the associated linear guide groove 16a. Hence, the set of three rotational guide projections 15a are disengaged from the rear circumferential surfaces 16d-R of the set of three rotational guide grooves 16d, respectively, and the set of three linear guide projections 13a of the linear guide ring 13 are disengaged from the position limiting surfaces 16a-S of the set of three linear guide grooves 16a, respectively, so that the position limitation by the rear circumferential surfaces 16d-R and the position limiting surfaces 16a-S is released. As a result, in the retracted state of the zoom lens 40, the distance between the first movable barrel 14 and the helicoid ring 15 in the optical axis direction slightly increases by the biasing force of the separating biasing springs 28 so that the a rear end surface of the helicoid ring 15 comes in contact with the outer annular flange 13e of the linear guide ring 13 as shown in FIG. 4. Consequently, the degree of compression of the separating biasing springs 28 becomes smaller than that in a ready-to-photograph state of the zoom lens 40, which weakens the biasing force of the separating biasing springs 28. In motor-driven retractable lens barrels such as the present embodiment of the zoom lens, the non-operational time when the retractable lens barrel is in the retracted state thereof with the power turned OFF is generally longer than the operational time when the retractable lens barrel is in a ready-to-photograph state, and accordingly, reducing the load on the separating biasing springs 28 when the zoom lens 40 is not in a ready-to-photograph state is effective at minimizing the aged deterioration of the separating biasing springs 28. Moreover, reducing the load on the separating biasing springs 28 when the zoom lens 40 is not in a ready-to-photograph state makes it possible to reduce the resistance to the advancing operation of the zoom lens 40 from the retracted position to a ready-to-photograph state and the resistance to the retracting operation of the zoom lens 40 from a ready-to-photograph state to the retracted position, thus making it possible to reduce the load on the zoom motor 29.

In the retracted state of the zoom lens 40, the helicoid ring 15 does not move in the optical axis direction accidentally even if the zoom lens 40 is not provided with engaging portions such as the set of three rotational guide projections 15a and the set of three rotational guide grooves 16d because the helicoid ring 15 is held by the resistance from the zoom gear 29a (the zoom motor 29) and the helicoidal engagement between the external helicoid 15b and the internal helicoid 16b. In addition, in the retracted state of the zoom lens 40, the linear guide ring 13 is prevented from moving forward by contact of the helicoid ring 15 with the outer annular flange 13e of the linear guide ring 13, and therefore, either the linear guide ring 13 or the first movable barrel 14 does not move in the optical axis direction accidentally.

As can be seen from the above description, in the present embodiment of the zoom lens 40, the first movable barrel 14 that serves as the first rotating member is coupled to the linear guide ring 13 to be integrally movable with the linear guide ring 13 in the optical axis direction, while the helicoid ring 15 that serves as the second rotating member is loosely coupled to the linear guide ring 13 to be movable slightly in the optical axis direction relative to the linear guide ring 13. Additionally, in a ready-to-photograph state of the zoom lens 40, due to the biasing force of the separating biasing springs 28, the axial position of the helicoid ring 15 is limited by the rear circumferential surfaces 16d-R while the axial positions of the linear guide ring 13 and the first movable ring 14 are limited by the position limiting surfaces 16a-S. Therefore, backlash among the linear guide ring 13, the first movable barrel 14 and the helicoid ring 15 is eliminated by a very simple backlash eliminating structure. Specifically, the biasing device for eliminating the backlash can be achieved by one type of biasing springs, i.e., the three separating biasing springs 28. Moreover, the zoom lens 40 does not have to be provided with any independent positioning member other than the stationary barrel 16 because position limiting surfaces for eliminating the backlash are provided as the rear circumferential surfaces 16d-R, which are portions of the set of three rotational guide grooves 16d that are adopted to guide rotation movements of the helicoid ring 15, and the position limiting surfaces 16a-S, which are portions of the linear guide grooves 16a that are adopted to guide linear movements of the linear guide ring 13.

Since the zoom lens 40 is constructed to limit not only the axial positions of the first movable barrel 14 and the helicoid ring 15, which are directly pressed by the separating biasing springs 28, but also the axial position of the linear guide ring 13, which is involved deeply in the positional accuracy of the first lens group L1 and the second lens group L2, with the use of the stationary barrel 16 that is provided as a stationary member by exerting the biasing force of the separating biasing springs 28 on the linear guide ring 13 via the first movable barrel 14, the positional accuracy of each optical element in a ready-to-photograph state of the zoom lens 40 is improved.

Although the present invention has been described based on the above illustrated embodiment, the present invention is not limited solely to this particular embodiment. For instance, although the present invention can be effectively applied to a zoom lens such as the above described zoom lens 40, effects similar to those obtained in the above illustrated embodiment of the zoom lens can also be obtained even in the case where the present invention is applied to a fixed-focal lens. Moreover, the present invention can also be applied to a support mechanism for supporting movable members in an apparatus other than a lens barrel.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A movable member supporting mechanism comprising:
   a support ring;
   a first rotatable member and a second rotatable member which are provided inside said support ring and supported by said support ring to be integrally rotatable in a common rotational direction and to be movable relative to each other in an axial direction thereof;
   a linearly moving member provided inside said support ring and coupled to said support ring to be integrally movable with said first rotatable member in said axial direction;
   a biasing device which biases said first rotatable member and said second rotatable member in opposite directions away from each other; and
   a first position limiting surface and a second position limiting surface which are formed on an inner peripheral surface of said support ring and are provided apart from each other in said axial direction,
   wherein said linearly moving member is biased by said biasing device via said first rotatable member, and
   wherein said first position limiting surface and said second position limiting surface limit positions of said linearly moving member and said second rotatable member in said axial direction, respectively.

2. The movable member supporting mechanism according to claim 1, further comprising:
   at least one axial groove formed on an inner peripheral surface of said support ring, at least one of opposite ends of said axial groove being formed as a closed end; and
   at least one radial projection which projects from said linearly moving member to be engaged in said axial groove,
   wherein said first position limiting surface is formed at said closed end of said axial groove.

3. The movable member supporting mechanism according to claim 2, wherein said at least one axial groove comprises a plurality of axial grooves, each of which has said closed end and which are arranged at different circumferential positions, and
   wherein said at least one radial projection comprises a corresponding plurality of radial projections arranged at different circumferential positions.

4. The movable member supporting mechanism according to claim 1, further comprising:
   at least one circumferential groove formed on an inner peripheral surface of said support ring to extend in a circumferential direction of said support ring; and
   at least one radial projection which projects from said second rotatable member to be engaged in said circumferential groove,
   wherein one of axially opposed surfaces in said circumferential groove which are opposed to each other in said axial direction serves as said second position limiting surface.

5. The movable member supporting mechanism according to claim 4, wherein said at least one radial projection of said second rotatable member comprises a plurality of radial projections arranged at different circumferential positions.

6. The movable member supporting mechanism according to claim 1, wherein each of said first rotatable member and said second rotatable member is formed as a ring member arranged substantially concentrically with said support ring, and
   wherein said biasing device comprises at least one compression spring installed between end surfaces of said first rotatable member and said second rotatable member which are opposed to each other.

7. The movable member supporting mechanism according to claim 6, wherein said compression spring comprises a plurality of compression springs arranged at different circumferential positions.

8. The movable member supporting mechanism according to claim 1, wherein said linearly moving member comprises a move-away prevention portion which prevents said second rotatable member from moving away from said first rotatable member beyond a predetermined point.

9. The movable member supporting mechanism according to claim 1, wherein said first rotatable member and said second rotatable member can move between a first state in which each of said first rotatable member and said second rotatable member moves in said axial direction while rotating relative to said support ring, and a second state in which each of said first rotatable member and said second rotatable member rotates at an axial fixed position thereof at one of opposite ends of the range of movement thereof in said axial direction,
   wherein said linearly moving member and said second rotatable member are in contact with said first position limiting surface and said second position limiting surface, respectively, in said second state, and
   wherein said linearly moving member and said second rotatable member are disengaged from said first position limiting surface and said second position limiting surface, respectively, in said first state.

10. The movable member supporting mechanism according to claim 9, wherein said second rotatable member is formed as a helicoid ring including an external helicoid formed on an outer peripheral surface of said helicoid ring,
    wherein said support ring comprises an internal helicoid which is in mesh with said external helicoid of said helicoid ring,
    wherein each of said first rotatable member and said second rotatable member moves in said axial direction while rotating relative to said support ring in a state where said internal helicoid of said support ring is in mesh with said external helicoid of said helicoid ring, and
    wherein said internal helicoid of said support ring and said external helicoid of said helicoid ring are disengaged from each other when each of said first rotatable member and said second rotatable member rotates at said axial fixed position thereof.

11. The movable member supporting mechanism according to claim 1, further comprising at least one optical element which is moved forward and rearward in an axial direction of said support ring in accordance with an axial movement of said linearly moving member and rotations of said first rotatable member and said second rotatable member.

12. The movable member supporting mechanism according to claim 1, wherein said support ring comprises a fixed ring to which a motor for rotating said first rotatable member and said second rotatable member is fixed.

13. The movable member supporting mechanism according to claim 1, wherein said biasing device comprises a plurality of compression coil springs.

14. The movable member supporting mechanism according to claim 10, wherein said helicoid ring comprises an annular gear which is formed on a thread of said external helicoid to be in mesh with a gear driven by a motor.

15. The movable member supporting mechanism according to claim 1, wherein said movable member supporting mechanism is incorporated in a motor-driven photographic lens.

16. A movable member supporting mechanism of a lens barrel comprising:
   a support ring, an axis of which extends substantially parallel to an optical axis;
   a first rotating ring and a second rotating ring which are positioned inside said support ring and supported by said support ring to be integrally rotatable in a rotation direction and to be movable relative to each other in said optical axis direction;
   a linearly moving ring positioned inside said support ring and coupled to said support ring to be integrally movable with said first rotating ring in said optical axis direction;
   a biasing device which biases said first rotating ring and said second rotating ring in opposite directions away from each other; and
   a first position limiting surface and a second position limiting surface which are formed on an inner peripheral surface of said support ring and provided apart from each other in said optical axis direction,
   wherein said linearly moving ring is biased by said biasing device via said first rotating ring, and
   wherein said first position limiting surface and said second position limiting surface limit positions of said linearly moving ring and said second rotating ring in said optical axis direction, respectively.

17. A movable member supporting mechanism including a first movable member and a second movable member which are supported by a support member to be rotatable about a rotational axis relative to each other and to be integrally movable in a direction of said rotation axis,
   wherein said support member comprises a first position limiting surface and a second position limiting surface which face in opposite directions away from each other in said rotation axis direction,
   wherein said first movable member comprises a motion limiting component and a moving-force transfer component which are separated from each other in said rotation axis direction and which are movable relative to each other in said rotation axis direction,
   wherein said moving-force transfer component is coupled to said second movable member to be integrally movable with said second movable member in said rotation axis direction,
   wherein said motion limiting component includes an engaging portion engageable with one of said first position limiting surface and said second position limiting surface,
   wherein said movable member supporting mechanism includes a biasing device which biases said motion limiting component and said moving-force transfer component in directions away from each other, and
   wherein a biasing force of said biasing device causes said engaging portion of said motion limiting component and an engaging portion of said second movable member to be brought into contact with said one and the other of said first position limiting surface and said second position limiting surface, respectively, to thereby limit positions of said first movable member and said second movable member in said rotation axis direction.

* * * * *